(12) United States Patent
Nishimura et al.

(10) Patent No.: US 11,791,064 B2
(45) Date of Patent: Oct. 17, 2023

(54) WIRING MEMBER AND ATTACHMENT STRUCTURE OF WIRING MEMBER

(71) Applicant: Sumitomo Wiring Systems, Ltd., Mie (JP)

(72) Inventors: Tetsuya Nishimura, Mie (JP); Takuya Kaba, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 266 days.

(21) Appl. No.: 17/312,786

(22) PCT Filed: Dec. 17, 2018

(86) PCT No.: PCT/JP2018/046281
§ 371 (c)(1),
(2) Date: Jun. 10, 2021

(87) PCT Pub. No.: WO2020/129110
PCT Pub. Date: Jun. 25, 2020

(65) Prior Publication Data
US 2022/0059255 A1 Feb. 24, 2022

(51) Int. Cl.
*H01B 7/40* (2006.01)
*H02G 3/32* (2006.01)
(Continued)

(52) U.S. Cl.
CPC .......... *H01B 7/40* (2013.01); *B60R 16/0215* (2013.01); *H01B 7/0045* (2013.01); *H02G 3/32* (2013.01)

(58) Field of Classification Search
CPC .......... H01B 7/40; H01B 7/0045; H02G 3/32; B60R 16/0215
(Continued)

(56) References Cited

U.S. PATENT DOCUMENTS 6,388,883 B1 * 5/2002 Serizawa ............ B60R 16/0215
361/752
2002/0079122 A1 6/2002 Droulez
(Continued)

FOREIGN PATENT DOCUMENTS

CN 101107890 1/2008
CN 202580310 U 12/2012
(Continued)

OTHER PUBLICATIONS

Japan Office Action issued in Japan Patent Application No. 2019-154291, dated Feb. 28, 2023, together with an English translation thereof.
(Continued)

*Primary Examiner* — Timothy J Thompson
*Assistant Examiner* — Michael F McAllister
(74) *Attorney, Agent, or Firm* — GREENBLUM & BERNSTEIN, P.L.C.

(57) ABSTRACT

A wiring member includes a wiring body and an attaching member attached to the wiring body to attach the wiring body to an attaching target. The wiring body includes a wire-like transmission member and a base member holding the wire-like transmission member. The attaching member includes a base material attachment part plastically deformed and sandwiching the base member from both sides of the base member in a front-back direction and an attaching target attachment part attached to an attaching target of the wiring body.

9 Claims, 15 Drawing Sheets

(51) Int. Cl.
  *B60R 16/02* (2006.01)
  *H01B 7/00* (2006.01)
(58) Field of Classification Search
  USPC ...................................................... 174/117 R
  See application file for complete search history.

(56) References Cited

U.S. PATENT DOCUMENTS

| | | | |
|---|---|---|---|
| 2005/0016760 A1* | 1/2005 | Vasichek ............ | B60R 16/0215 174/135 |
| 2009/0009977 A1 | 1/2009 | Enomoto et al. | |
| 2009/0260196 A1 | 10/2009 | Lien | |
| 2014/0151116 A1* | 6/2014 | Doshita ................ | F16B 5/0664 174/70 R |
| 2015/0108287 A1 | 4/2015 | Arai et al. | |
| 2015/0276093 A1 | 10/2015 | Aotani | |
| 2015/0294768 A1 | 10/2015 | Sakaki et al. | |
| 2016/0109037 A1 | 4/2016 | Tsuchiya | |
| 2016/0156165 A1* | 6/2016 | Katou ..................... | H02G 3/26 174/99 R |

FOREIGN PATENT DOCUMENTS

| | | |
|---|---|---|
| CN | 104160795 | 11/2014 |
| CN | 104737398 | 6/2015 |
| CN | 105529659 | 4/2016 |
| FR | 2818816 | 6/2002 |
| JP | 7-212932 | 8/1995 |
| JP | 2008-118803 | 5/2008 |
| JP | 2009-273209 | 11/2009 |
| JP | 2015-154635 | 8/2015 |
| JP | 2015-192520 | 11/2015 |
| JP | 2016-046824 | 4/2016 |
| JP | 2017-046443 | 3/2017 |
| JP | 2018-101573 | 6/2018 |
| KR | 10-2006-0069097 | 6/2006 |

OTHER PUBLICATIONS

China Decision of Grant issued in China Patent Application No. 201880099883.2, dated Jan. 4, 2023, together with a partial English translation (translation of Search Report).

Japan Office Action issued in Japan Patent Application No. 2019-154291, dated Oct. 18, 2022, together with an English translation thereof.

International Search Report issued in International Patent Application No. PCT/JP2018/046281, dated Jan. 29, 2019, along with an English translation thereof.

China Office Action issued in China Patent Application No. 201880099883.2, dated Apr. 19, 2022, together with an English translation thereof.

* cited by examiner

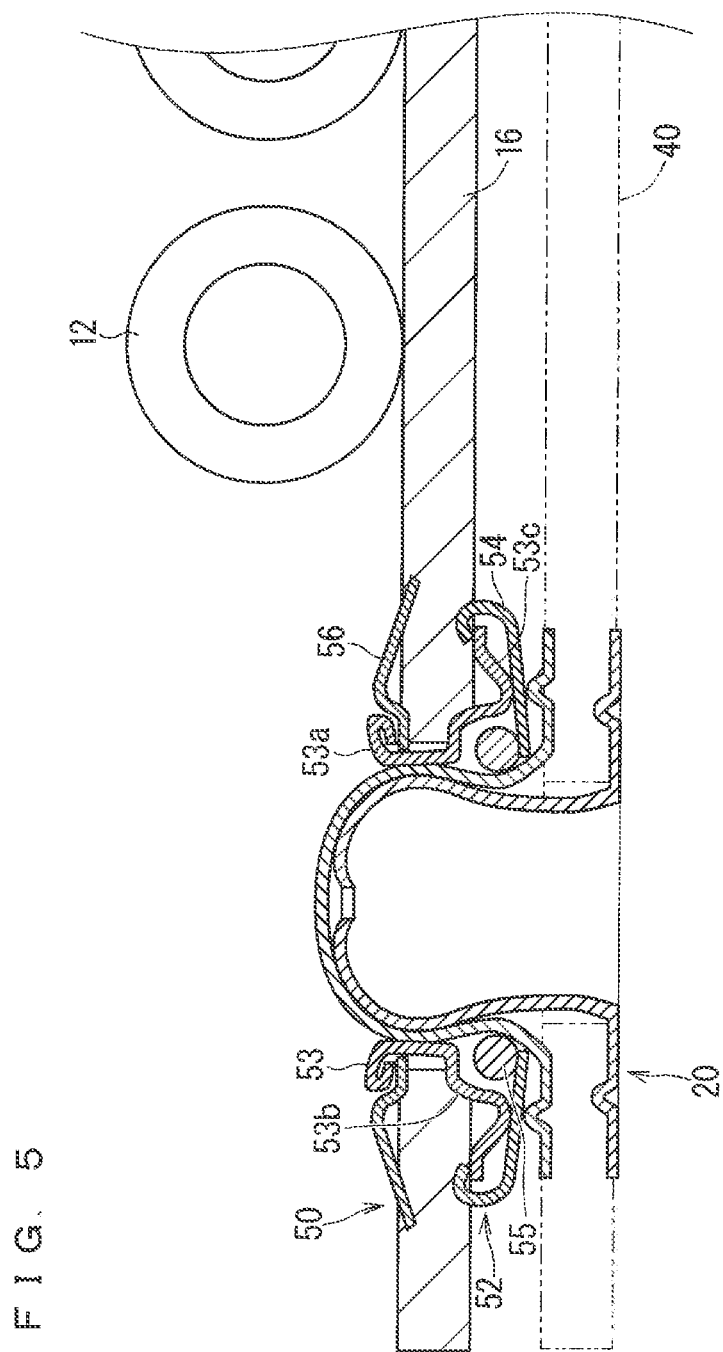
F I G. 5

WIRING MEMBER AND ATTACHMENT STRUCTURE OF WIRING MEMBER

TECHNICAL FIELD

The present invention relates to a technique of attaching a wiring member to an attaching target member such as a vehicle.

BACKGROUND ART

Patent Document 1 discloses a clamp including an electrical wire attachment part attachable to an electrical wire, a first locking part formed to be able to be inserted into and locked to an attaching hole formed in an attaching target object, and a second locking part formed to be able to be inserted into and locked to a fixing hole formed in a protection material.

PRIOR ART DOCUMENTS

Patent Documents

Patent Document 1: Japanese Patent Application Laid-Open No. 2017-46443

SUMMARY

Problem to be Solved by the Invention

However, in the technique described in Patent Document 1, the second locking part of the clamp is locked to the protection material using rigidity of the protection material which is a plastic cardboard, thus it may be hard to attach the clamp to the protection material when the protection material is soft.

An object of the present invention is to provide a technique capable of attaching an attaching member even when a base member is soft.

Means to Solve the Problem

In order to solve the above problem, a wiring member according to a first aspect includes: a wiring body including at least one wire-like transmission member and a base member holding the wire-like transmission member, and an attaching member including a base material attachment part plastically deformed and sandwiching the base member from both sides of the base member in a front-back direction and an attaching target attachment part attached to an attaching target of the wiring body.

A wiring member according to a second aspect is the wiring member according to the first aspect, wherein the base material attachment part includes a first sandwiching part and a second sandwiching part molded separately from each other to sandwich the base member from the both sides of the base member in the front-back direction and a plastic deformation part plastically deformed to maintain a sandwiching state of the first sandwiching part and the second sandwiching part.

A wiring member according to a third aspect includes: at least one wire-like transmission member and a base member holding the wire-like transmission member; and an attaching member including a base material attachment part which has an elastic sandwiching part and a receiving part elastically deformed and molded to be able to be fitted to each other to sandwich the base member from both sides of the base member in a front-back direction in a state of being fitted to each other and an attaching target attachment part attached to an attaching target of the wiring body.

A wiring member according to a fourth aspect is the wiring member according to any one of the first to third aspects, wherein the base material attaching part sandwiches a peripheral part of a through hole formed in the base member.

A wiring member according to a fifth aspect is the wiring member according to any one of the first to fourth aspects, wherein the wiring body is a flat wiring body formed by arranging the plurality of wire-like transmission members on the base member.

A wiring member according to a sixth aspect is the wiring member according to the fifth aspect, wherein the attaching target attachment part is provided to be able to attach the attaching target in a front-back direction of the flat wiring body.

An attachment structure of a wiring member according to a seventh aspect includes the plurality of wiring members according to claim 5 or 6, wherein the attaching member of a first wiring member in the plurality of wiring members is attached to the attaching member of a second wiring member in the plurality of wiring members.

An attachment structure of a wiring member according to an eighth aspect includes the wiring member according to the fifth or sixth aspect and a vehicle body to which the wiring member is attached using the attaching member.

An attachment structure of a wiring member according to a ninth aspect is the attachment structure of the wiring member according to the eighth aspect, wherein the vehicle body includes a curved surface, and an intermediate part of the flat wiring body along a width direction is curved and disposed along the curved surface of the vehicle body, and both end portions of the flat wiring body along the width direction are attached to the vehicle body by the attaching member.

Effects of the Invention

According to the first aspect, the base material attachment part is plastically deformed and sandwiches the base member, and the attaching member is attached to the base member, thus even when the base member is soft, the attaching member can be attached.

According to the second aspect, the plastic deformation part can firmly sandwich the base member.

According to the third aspect, the elastic sandwiching part and the receiving part fitted to each other sandwich the base member in the base material attachment part, thus the attaching member can be attached even when the base member is soft.

According to the fourth aspect, the attaching member can be attached to an optional position in the base member where the through hole can be formed.

According to the fifth aspect, the attaching member can be firmly attached to the flat wiring body.

According to the sixth aspect, the three or more members can be attached at one position by the attaching member.

According to the seventh aspect, the wiring members can be attached to each other by the attaching member.

According to the eighth aspect, the wiring member can be attached to the vehicle body by the attaching member.

According to the ninth aspect, the flat wiring body can be curved and disposed along the curved surface of the vehicle body.

BRIEF DESCRIPTION OF DRAWINGS

FIG. 5 A cross-sectional view illustrating an example that the female snap fastener is provided in the wiring member and the male snap fastener is provided in an attaching target member.

DESCRIPTION OF EMBODIMENT(S)

First Embodiment

Figure 1:
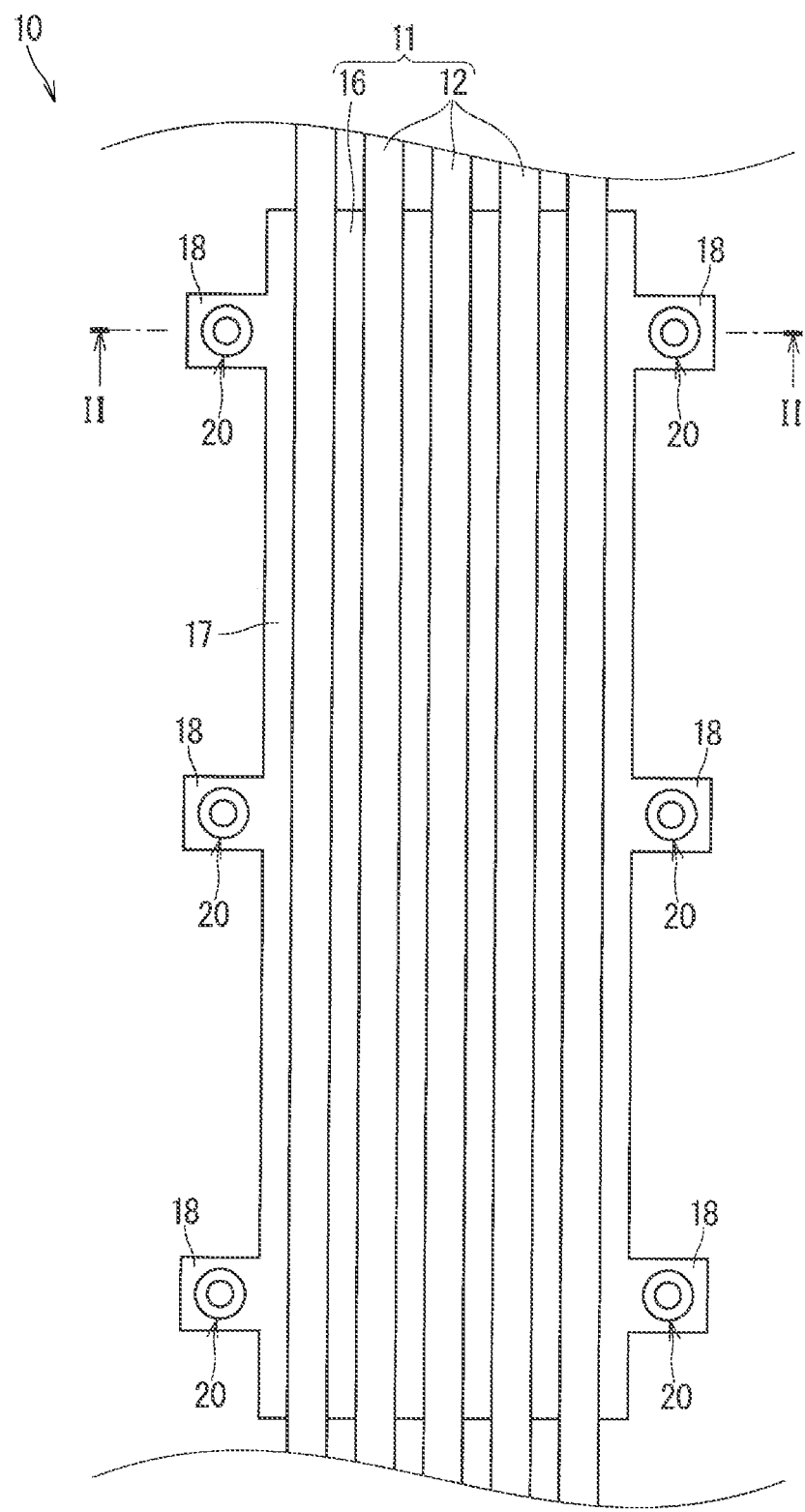
FIG. 1 A plan view illustrating a wiring member according to a first embodiment.
Figure 2:
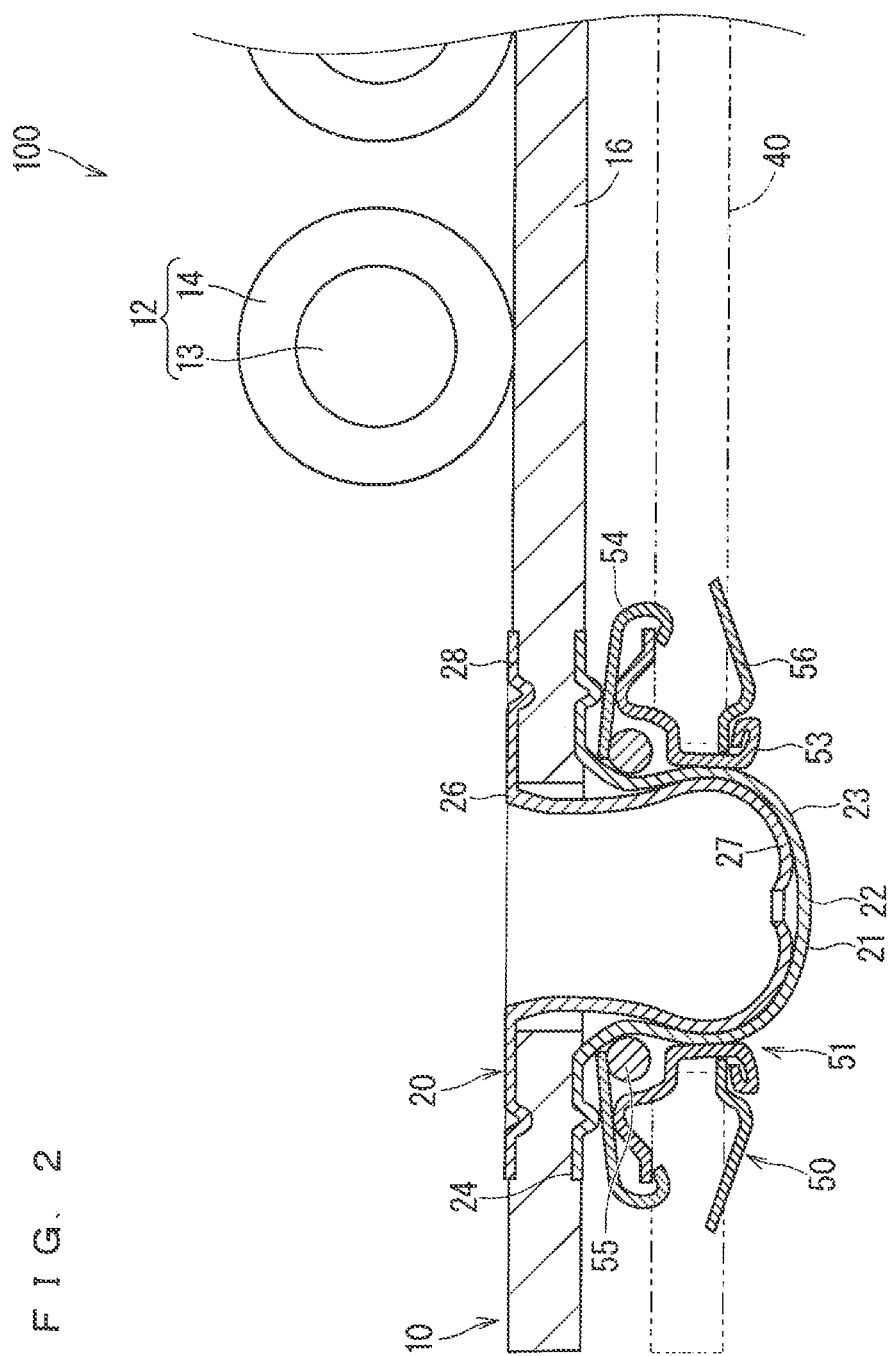
FIG. 2 A cross-sectional view illustrating an attachment structure of the wiring member according to the first embodiment.

A wiring member and an attachment structure thereof according to a first embodiment is described hereinafter. FIG. 1 is a plan view illustrating a wiring member 10 according to the first embodiment. FIG. 2 is a cross-sectional view illustrating an attachment structure 100 of the wiring member according to the first embodiment. FIG. 2 is a cross-sectional view of the wiring member 10 cut along a II-II line in FIG. 1.

The wiring member 10 is mounted to a vehicle to transmit electrical power or light to each component mounted to the vehicle. The wiring member 10 includes a wiring body 11 and an attaching member 20 attached to the wiring body 11. The attaching member 20 is a member for attaching the wiring body 11 to an attaching target member 40. The wiring member 10 is attached to the attaching target member 40 by the attaching member 20 to constitute the attachment structure 100 of the wiring member.

The wiring body 11 includes a wire-like transmission member 12 and a base member 16 holding the wire-like transmission member 12. Described herein is an example that the wiring body 11 includes the plurality of wire-like transmission members 12. Also described herein is an example that the plurality of wire-like transmission members 12 are a flat wiring body 11 kept flat by the base member 16.

It is sufficient that the wire-like transmission member 12 is a wire-like member transmitting electrical power or light, for example. For example, the wire-like transmission member 12 may be a general wire having a core wire and a covering around the core wire, or may also be a bare conductive wire, a shielded wire, an enamel wire, a nichrome wire, or an optical fiber.

The wire-like transmission member 12 transmitting the electrical power may be various kinds of signal lines or various kinds of power lines. The wire-like transmission member 12 transmitting the electrical power may be used as an antenna or coil, for example, transmitting or receiving a signal or electrical power to or from a space.

In the description herein, the wire-like transmission member 12 is a general wire 12 (simply referred to as the electrical wire 12 hereinafter). The electrical wire 12 includes a core wire 13 as a transmission wire body and an insulating covering 14 as a covering for covering the core wire 13. Each description on the electrical wire 12 is applicable to each exemplified object of the wire-like transmission member 12 except for a configuration to which the description is not applicable.

The core wire 13 is made up of one or a plurality of strands. The strand is formed of a conductor made of copper, copper alloy, aluminum, or aluminum alloy, for example. When the core wire 13 is made up of the plurality of strands, the plurality of strands may be stranded. The insulating covering 14 is formed of a resin material such as polyvinyl chloride (PVC) or polyethylene (PE) extrusion-molded around the core wire. Herein, the electrical wire 12 is a so-called round wire having a round shape in cross section.

It is sufficient that the base member 16 is a member holding the electrical wire 12. Herein, the base member 16 is a member holding the electrical wire 12 in a state of two-dimensionally positioning the electrical wire 12. It is sufficient that the base member 16 disposed in an operation position, for example, can hold the electrical wire 12 in the state of being two-dimensionally positioned. Thus, the base member 16 may be a flexible sheet-like member which can be bended easily. The base member 16 may be a sheet-like member having rigidity with a degree of being able to be curved and hold the electrical wire 12 in a state of being two-dimensionally positioned, or may be a sheet-like member having rigidity with a degree of being able to keep itself in a flat state and hold the electrical wire 12 in a state of being two-dimensionally positioned. The base member 16 may have a three-dimensional shaped part such as a part made up of a wall partially standing on the base member 16.

In the description herein, the base member 16 is the sheet member 16 which can be bended. Each description on the sheet member 16 is applicable to the base member 16 except for a configuration to which the description is not applicable.

A material constituting the sheet member 16 is not particularly limited, however, the sheet member 16 is preferably formed of a material containing a resin of polyvinyl chloride (PVC), polyethylene terephthalate (PET), or polypropylene (PP). The sheet member 16 may be the sheet member 16 with an inner portion evenly filled or a non-woven sheet, for example. The sheet member 16 may contain a material such as metal. The sheet member 16 preferably has flexibility of easily bending in a thickness direction. The sheet member 16 may be made up of a single layer or a plurality of stacked layers. When the sheet member 16 is made up of the plurality of stacked layers, it is considered that a resin layer and a resin layer are stacked, for example. It is also considered that a resin layer and a metal layer are stacked, for example.

The electrical wire 12 is fixed to one main surface of the sheet member 16. The electrical wire 12 is fixed along a predetermined route on one main surface of the sheet member 16. In the example illustrated in FIG. 1, the route of the electrical wire 12 on the sheet member 16 forms a straight line, but may also be midway bended. When the plurality of electrical wires 12 are fixed on one main surface of the sheet member 16, the plurality of electrical wires 12 may be or may not be midway branched.

The sheet member 16 is formed into a shape following the route of the plurality of electrical wires 12 described above. At this time, the sheet member 16 includes a band-like part 17 following the route of the electrical wire 12 and an extension part 18 extending to a lateral side of the band-like part 17. The electrical wire 12 is fixed to the band-like part 17. The attaching member 20 is provided in the extension part 18.

Applicable as a state of fixing the electrical wire 12 and the sheet member 16 is a contact area fixation and a non-contact area fixation, or both fixations may be used together. Herein, the contact area fixation indicates that a portion where the electrical wire 12 and the sheet member 16 have contact with each other is stuck and fixed. The non-contact area fixation indicates the fixing state which is not the contact area fixation. For example, a sewing thread, the other sheet member, or an adhesive tape presses the electrical wire 12 toward the sheet member 16, or a sewing thread, the other sheet member, or an adhesive tape surrounds the electrical wire 12 and the sheet member 16, thereby holding the electrical wire 12 and the sheet member 16 to keep the electrical wire 12 and the sheet member 16 fixed to each other. In the description hereinafter, the electrical wire 12 and the sheet member 16 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the electrical wire 12 and the sheet member 16 are indirectly stuck and fixed via an intervening member such as an adhesive agent, a gluing agent, and a double-sided adhesive tape provided therebetween. The contact area direct fixation indicates that the electrical wire 12 and the sheet member 16 are directly stuck and fixed without an intervention of the adhesive agent, for example, which is separately provided. Considered in the contact area direct fixation is that resin included in at least one of the electrical wire 12 and the sheet member 16 is melted, thus the electrical wire 12 and the sheet member 16 are stuck and fixed, for example. In the description hereinafter, the electrical wire 12 and the sheet member 16 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 12 and the base member 16 are in the state of the contact area direct fixation by these means. Specifically, when the state of the contact area direct fixation is formed by the ultrasonic welding, for example, the electrical wire 12 and the sheet member 16 are in the state of the contact area direct fixation by the ultrasonic welding. A portion where the state of the contact area direct fixation by the heat is formed by the welding (a fixing portion between the electrical wire 12 and the sheet member 16) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the covering 14 of the electrical wire 12 may be melted, or only the resin included in the sheet member 16 may be melted. In these cases, the resin which has been melted is stuck on an outer surface of the resin on the other side, and a relatively clear interface may be formed in some cases. In the case of the contact area direct fixation, both the resin included in the covering 14 of the electrical wire 12 and the resin included in the sheet member 16 may be melted. In this case, there may be a case where both the resins are mixed and a clear interface is not formed. Particularly, when the covering 14 of the electrical wire 12 and the sheet member 16 include compatible resin such as the same resin material, for example, there may be a case where both the resins are mixed and a clear interface is not be formed.

The attaching member 20 includes a base material attachment part attached to the base member 16 and an attaching target attachment part attached to an attaching target of the wiring body 11. Described herein is an example that the base material attachment part is plastically deformed and sandwiches the base member 16 from both sides of the base member 16 in a front-back direction. The base material attachment part includes a first sandwiching part and a second sandwiching part sandwiching the base member 16 from the both sides of the base member 16 in the front-back direction and a plastic deformation part plastically deformed to maintain the sandwiching state of the first sandwiching part and the second sandwiching part. The base material attachment part sandwiches a peripheral part of a through hole formed in the base member 16.

The attaching member 20 is attached to the extension part 18 of the sheet member 16. The attaching member 20 is attached to the extension part 18 using a through hole 18*h* formed in the extension part 18. Accordingly, described in the present example is an example that the base material attachment part is formed to sandwich a peripheral part of the through hole 18h of the extension part 18.

The attaching target attachment part is formed into a shape corresponding to the attaching target member 40. The attaching target attachment part is not particularly limited as long as it can be attached to the attaching target member 40. Herein, a snap is used for attaching the wiring member 10 and the attaching target member 40. Thus, the wiring member 10 and the attaching target member 40 are detachably attached easily. The snap is an attachment in which a concave-shaped part and a convex-shaped part are used in a pair, and is a member snapping a portion where fabrics overlap with each other in a clothing usage, for example. In the snap, the convex-shaped part is referred to as a male snap fastener 20 and the concave-shaped part is referred to as a female snap fastener 50. The snap fastener is also referred to as a snap button, for example. Described herein is an example that the male snap fastener 20 is provided as the attaching member 20, however, the female snap fastener 50 may be provided in the attaching member 20.

Figure 3:
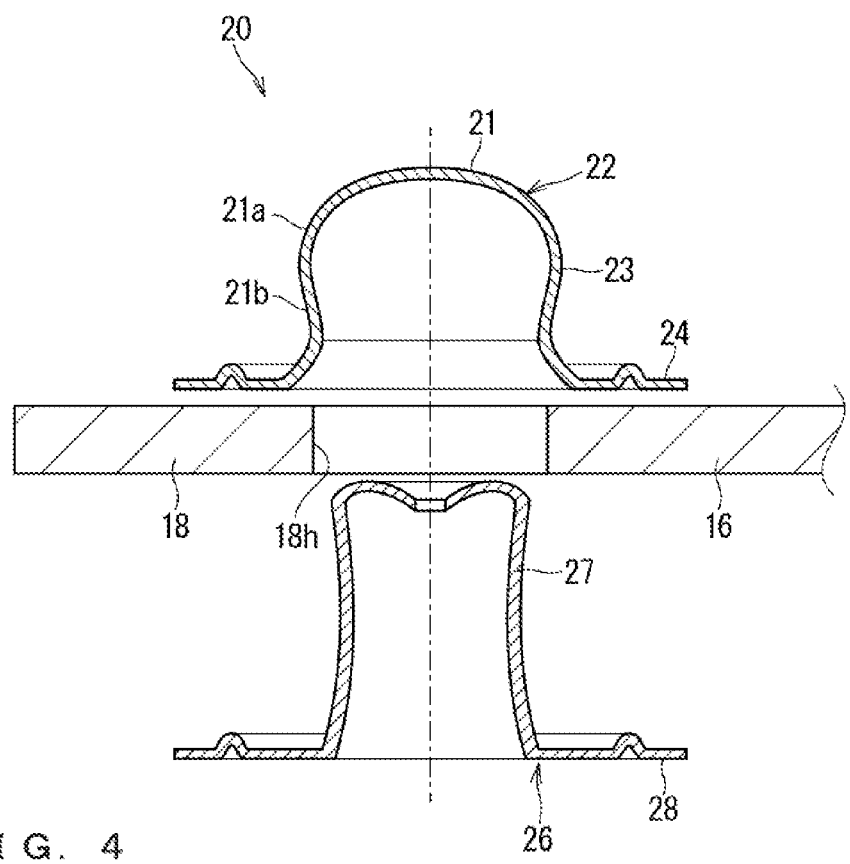
FIG. 3 An exploded cross-sectional view of a male snap fastener.

FIG. 3 is an exploded cross-sectional view of the male snap fastener 20 used as the attaching member 20.

The male snap fastener 20 includes the base material attachment part and the attaching target attachment part described above. Specifically, the male snap fastener 20 is made up of a plurality of components molded separately from each other, herein. In the example illustrated in FIG. 3, the male snap fastener 20 is made up of a male body part 22 and a snap 26 molded separately from each other. The male snap fastener 20 is made of metal or resin, for example.

The male body part 22 includes a fitting head part 23 for attaching the male snap fastener 20 to the female snap fastener 50 and a flange part 24 spreading from a base end portion of the fitting head part 23 to an outer peripheral side. Herein, the fitting head part 23 is formed into a cylindrical shape.

The snap 26 includes an attaching head part 27 passing through the through hole 18h formed in the sheet member 16 and inserted into the fitting head part 23 and a flange part 28 spreading from a base end portion of the attaching head part 27 to an outer peripheral side.

Herein, the sheet member 16 is sandwiched between the flange parts 24 and 28, thus the male snap fastener 20 is attached to the wiring body 11. At this time, the attaching head part 27 passing through the sheet member 16 is inserted into the fitting head part 23, thus maintained is a state where the sheet member 16 is partially sandwiched between the flange parts 24 and 28. More specifically, a tip end portion of the attaching head part 27 is swaged when the attaching head part 27 passing through the sheet member 16 is inserted into the fitting head part 23, and is plastically deformed into a shape corresponding to an inner surface shape of the fitting head part 23. For example, the tip end portion of the attaching head part 27 inserted into the fitting head part 23 has direct contact with an inner surface of the fitting head part 23 in a state where an outer surface of the fitting head part 23 is supported by a jig, for example, and is subsequently elastically deformed into the inner surface shape of the fitting head part 23 upon receiving force from the inner surface of the fitting head part 23. Accordingly, the detent of the attaching head part 27 returning from the fitting head part 23 is achieved, thus the state where the flange parts 24 and 28 sandwich the sheet member 16 is maintained.

Accordingly, in the male snap fastener 20, it is deemed that the flange parts 24 and 28 are the first sandwiching part and the second sandwiching part described above, the attaching head part 27 is the plastic deformation part, and these are the base material attachment part. In the male snap fastener 20, the fitting head part 23 and the attaching head part 27 constitute a convex-shaped part 21 as the attaching target attachment part.

The attaching target member 40 is an attaching target of the wiring member 10. Described herein is an example that the attaching target member 40 is a vehicle body. The vehicle body is a frame, a panel, and a reinforcement member, for example. In the example illustrated in FIG. 2, the attaching target member 40 is a member having a flat surface. Herein, the wiring member 10 being in a developed state is attached on the flat surface of the attaching target member 40. An attaching hole 40h is formed in the attaching target member 40. The female snap fastener 50 is attached to the attaching hole 40h.

Figure 4:
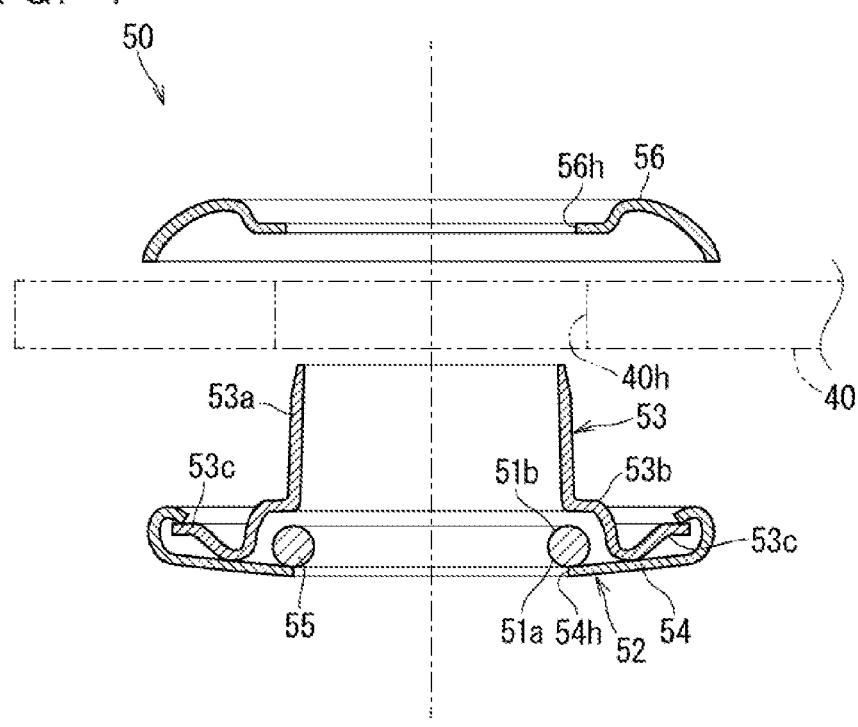
FIG. 4 An exploded cross-sectional view of a female snap fastener.

FIG. 4 is an exploded cross-sectional view of the female snap fastener 50.

The female snap fastener 50 includes an attachment structure part in addition to a concave-shaped part 51. The attachment structure part is a part for attaching the female snap fastener 50 itself to a member to which the concave-shaped part 51 is attached (the attaching target member 40 herein). When the female snap fastener 50 is attached to the base member, the attachment structure part corresponds to the base material attachment part described above.

Specifically, the female snap fastener 50 is made up of a plurality of components molded separately from each other, herein. In the example illustrated in FIG. 4, the female snap fastener 50 is made up of a female body part 52 and a receiving part 56 molded separately from each other. The female snap fastener 50 is made of metal or resin, for example.

The female body part 52 includes a cylindrical body 53, a holding plate 54, and a ring spring 55. The cylindrical body 53, the holding plate 54, and the ring spring 55 are members molded separately from each other. In the female body part 52, a hole part continuously formed in the cylindrical body 53, the holding plate 54, and the ring spring 55 is the concave-shaped part 51.

As illustrated in FIG. 4, in the cylindrical body 53, a small cylindrical part 53a, a large cylindrical part 53b having a larger diameter than the small cylindrical part 53a, and a flange part 53c having a larger diameter than the large cylindrical part 53b are formed into a continuous shape continuing from one side to the other side in an axial direction in a state before the female snap fastener 50 is attached to the attaching target member 40. The small cylindrical part 53a is a part swaged and plastically deformed when the female snap fastener 50 is attached to the attaching target member 40. Herein, the small cylindrical part 53a has a length dimension and a diameter dimension large enough to pass through the attaching hole 40h formed in the attaching target member 40 of the female snap fastener 50. The ring spring 55 is housed inside the large cylindrical part 53b. A level difference part is generated between the large cylindrical part 53b and the small cylindrical part 53a to prevent the ring spring 55 from coming out of the large cylindrical part 53b. The flange part 53c is a part held by the holding plate 54.

In the holding plate 54, a through hole 54h coaxial with the small cylindrical part 53a is formed in a center of a circular plate-like member and an outer peripheral part is reflexed and deformed to hold the flange part 53c. The through hole 54h of the holding plate 54 is set smaller than an outer diameter of the ring spring 55. Accordingly, the detent of the ring spring 55 can be achieved in the state where the holding plate 54 is held by the flange part 53c.

The ring spring 55 is an elastic deformation part widening the concave-shaped part 51 at the time of inserting the convex-shaped part 21. The convex-shaped part 21 is inserted into the ring spring 55, thus the ring spring 55 can also be deemed as a part of the concave-shaped part 51. In a natural state, the outer diameter of the ring spring 55 is formed smaller than an inner diameter of the large cylindrical part 53b. Accordingly, the ring spring 55 can be elastically deformed to spread to an outer peripheral side. In a natural state, an inner diameter of the ring spring 55 is formed smaller than an inner diameter of the small cylindrical part 53a and through hole 54h of the holding plate 54. Accordingly, an inner peripheral part of the ring spring 55 is the narrowest part in the concave-shaped part 51.

The receiving part 56 is formed into a circular plate-like shape, for example. A through hole 56h into which the small cylindrical part 53a can be inserted is formed in the receiving part 56.

The female snap fastener 50 is attached to the attaching target member 40 as follows. That is to say, in a state where the female body part 52 is located on one side of the attaching target member 40 and the receiving part 56 is located on the other side of the attaching target member 40, the small cylindrical part 53a of the female body part 52 passes through the attaching hole 40h formed in the attaching target member 40 and the through hole 56h formed in the receiving part 56. Then, the tip end portion of the small cylindrical part 53a of the female body part 52 passing through the attaching hole 40h formed in the attaching target member 40 and the through hole 56h formed in the receiving part 56 is swaged and plastically deformed to press a rear surface of the receiving part 56.

Herein, the tip end portion of the small cylindrical part 53a is formed into a continuous shape in a circumferential direction. In this case, the swaged tip end portion of the small cylindrical part 53a presses a whole periphery of one attaching hole 40h. However, the tip end portion of the small cylindrical part 53a may be formed into a shape other than the shape described above, thus may also be formed into a shape in which a plurality of pieces are divided in the circumferential direction. In this case, the swaged plurality of pieces of tip end portion of the small cylindrical part 53a press the periphery of one attaching hole 40h at a plurality of positions separated from each other in the circumferential direction.

A sandwiching structure by the female body part 52 and the receiving part 56 and a swage structure of the female body part 52 for maintaining the sandwiching structure in the female snap fastener 50 can be deemed as an attachment structure part for attaching the female snap fastener 50 to the attaching target member 40.

FIG. 5 is a cross-sectional view illustrating an example that the female snap fastener 50 is provided in the wiring member 10 and the male snap fastener 20 is provided in the attaching target member 40. As is the case in this example, it is applicable that the female snap fastener 50 is provided in the wiring member 10 and the male snap fastener 20 is provided in the attaching target member 40. When the female snap fastener 50 is attached to the base member 16 as is the case in this example, it can be deemed that the female body part 52 (the large cylindrical part 53b, the flange part 53c, and the holding plate 54) and the receiving part 56 are the first sandwiching part and the second sandwiching part, the small cylindrical part 53a is the plastic deformation part, and they are the base material attachment part. The concave-shaped part 51 and the ring spring 55 can be deemed as the attaching target attachment part.

The male snap fastener 20 or the female snap fastener 50 can be attached to the base member 16 using a swaging jig, for example. That is to say, the male snap fastener 20 or the female snap fastener 50 can be plastically deformed and attached to the base member 16 by the swaging jig. Accordingly, the male snap fastener 20 or the female snap fastener 50 can be easily attached to the base member 16.

The convex-shaped part 21 includes a first insertion part 21a formed to be gradually widened from a tip end side to a back end side in an insertion direction of being inserted into the concave-shaped part 51 and a second insertion part 21b located closer to the back end side in the insertion direction of being inserted into the concave-shaped part 51 in relation to the first insertion part 21a and formed to be gradually narrowed from the tip end side to the back end side in the insertion direction of being inserted into the concave-shaped part 51. A portion formed to be widest in the convex-shaped part 21 is located between the first insertion part 21a and the second insertion part 21b.

The concave-shaped part 51 includes a first inserted part 51a formed to be gradually widened from a tip end side to a back end side in which the convex-shaped part 21 is inserted and a second inserted part 51b located closer to the back end side in the insertion direction of the convex-shaped part 21 in relation to the first inserted part 51a and formed to be gradually narrowed from the tip end side to the back end side in the insertion direction of the convex-shaped part 21. Herein, the ring spring 55 is formed into a circular shape in cross section, thus the first inserted part 51a and the second inserted part 51b are formed side by side in an axial direction in an inner peripheral portion of the ring spring 55.

When the convex-shaped part 21 is inserted into the concave-shaped part 51 upon receiving force toward a first direction, the elastic deformation part 55 is elastically deformed by the force toward the first direction to fit the convex-shaped part 21 to the concave-shaped part 51. When the convex-shaped part 21 is pulled from the concave-shaped part 51 upon receiving force toward a second direction opposite to the first direction, the elastic deformation part 55 is elastically deformed by the force toward the second direction in a direction similar to the case of receiving the force toward the first direction, and releases the fitting state of the convex-shaped part 21 and the concave-shaped part 51.

The elastic deformation part 55 is provided in the concave-shaped part 51. The elastic deformation part 55 is formed to be able to widen an opening of the concave-shaped part 51 at the time of inserting the first insertion part 21a in attaching the convex-shaped part 21 and the concave-shaped part 51 and narrowing the opening of the concave-shaped part 51 at the time of inserting the second insertion part 21b. The elastic deformation part 55 is formed to be able to widen the opening of the concave-shaped part 51 at the time of inserting the second insertion part 21b in releasing the attachment of the convex-shaped part 21 and the concave-shaped part 51.

More specifically, the ring spring 55 is provided as the elastic deformation part 55 herein. Then, in attaching the convex-shaped part 21 and the concave-shaped part 51, that is to say, in attaching the male snap fastener 20 and the female snap fastener 50, the ring spring 55 is widened by the first insertion part 21a when the first insertion part 21a of the convex-shaped part 21 is inserted into the ring spring 55. Then, after the convex-shaped part 21 passes through the first insertion part 21a, the ring spring 55 is elastically recovered and narrowed when the second insertion part 21b is inserted. Accordingly, the ring spring 55 is fitted in a hollow part of the convex-shaped part 21 for retaining and detent, and the male snap fastener 20 and the female snap fastener 50 are attached to each other.

In contrast, in releasing the attachment of the convex-shaped part 21 and the concave-shaped part 51, that is to say, in releasing the attachment of the male snap fastener 20 and the female snap fastener 50, the ring spring 55 is widened by the second insertion part 21b when the second insertion part 21b of the convex-shaped part 21 is inserted into the ring spring 55. Accordingly, the convex-shaped part 21 can pass through the ring spring 55, and when the convex-shaped part 21 passes therethrough, the attachment of the male snap fastener 20 and the female snap fastener 50 is released. After the second insertion part 21b of the convex-shaped part 21 passes through the ring spring 55, the ring spring 55 is elastically recovered and narrowed when the first insertion part 21a is inserted. Accordingly, the male snap fastener 20 and the female snap fastener can be attached to each other again.

According to the wiring member 10 and the attachment structure 100 thereof having the above configuration, the base material attachment part is plastically deformed and sandwiches the base member 16, and the attaching member 20 is attached to the base member 16, thus even when the base member 16 is soft, the attaching member 20 can be attached.

The plastic deformation part can strengthen the state where the first sandwiching part and the second sandwiching part sandwich the base member 16.

The base material attachment part sandwiches the peripheral part of the through hole 18h formed in the base member 16, thus the attaching member 20 can be attached to an optional position in the base member 16 where the through hole 18h can be formed. At this time, when the through hole 18h is formed in the base member 16 in advance, the base material attachment part needs not be formed into a shape capable of passing through the part of the base member 16 where the through hole 18h is not formed.

The wiring body 11 is the flat wiring body 11 formed by arranging the plurality of wire-like transmission members 12 on the base member 16, thus the attaching member 20 can be firmly attached to the flat wiring body 11.

The wiring member 10 is attached to the vehicle body 40 by the attaching member 20. In this manner, the wiring member 10 can be attached to vehicle body 40 by the attaching member 20.

Second Embodiment

Figure 6:
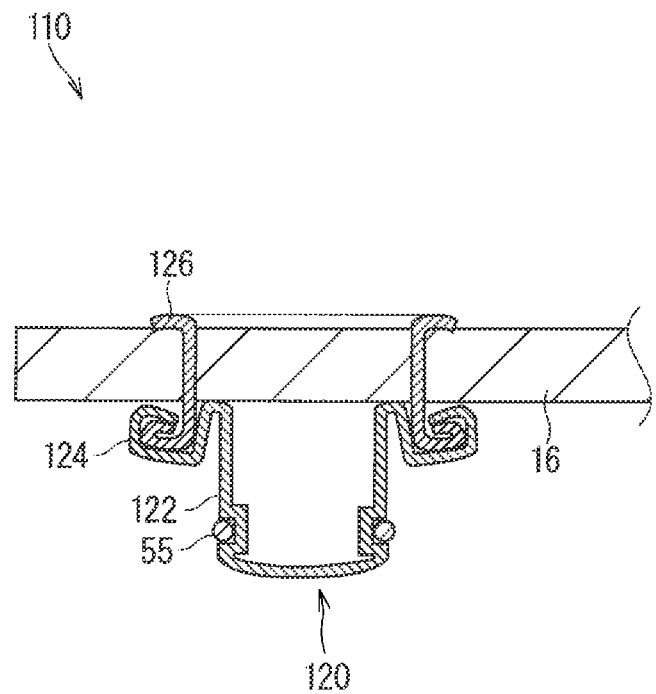
FIG. 6 A cross-sectional view illustrating a wiring member according to a second embodiment.
Figure 7:
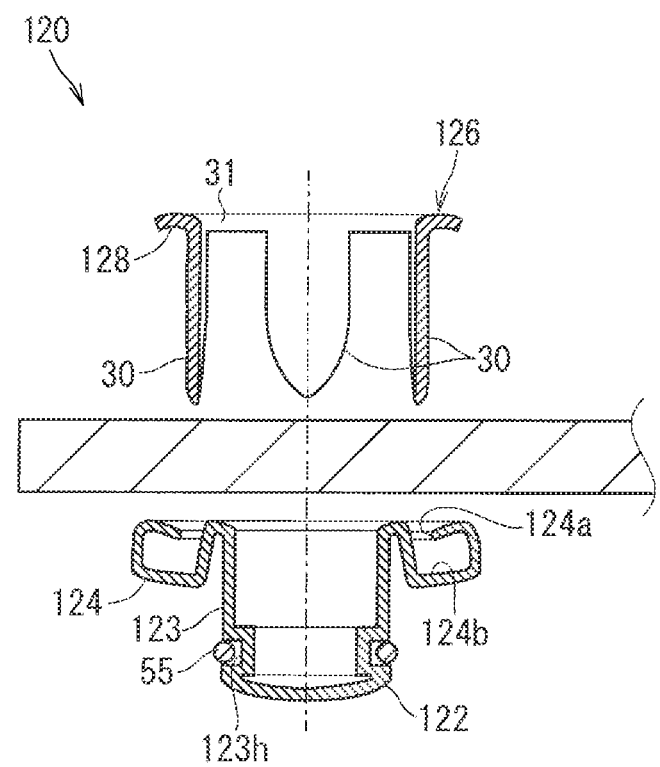
FIG. 7 An exploded cross-sectional view illustrating the wiring member according to the second embodiment.
Figure 8:
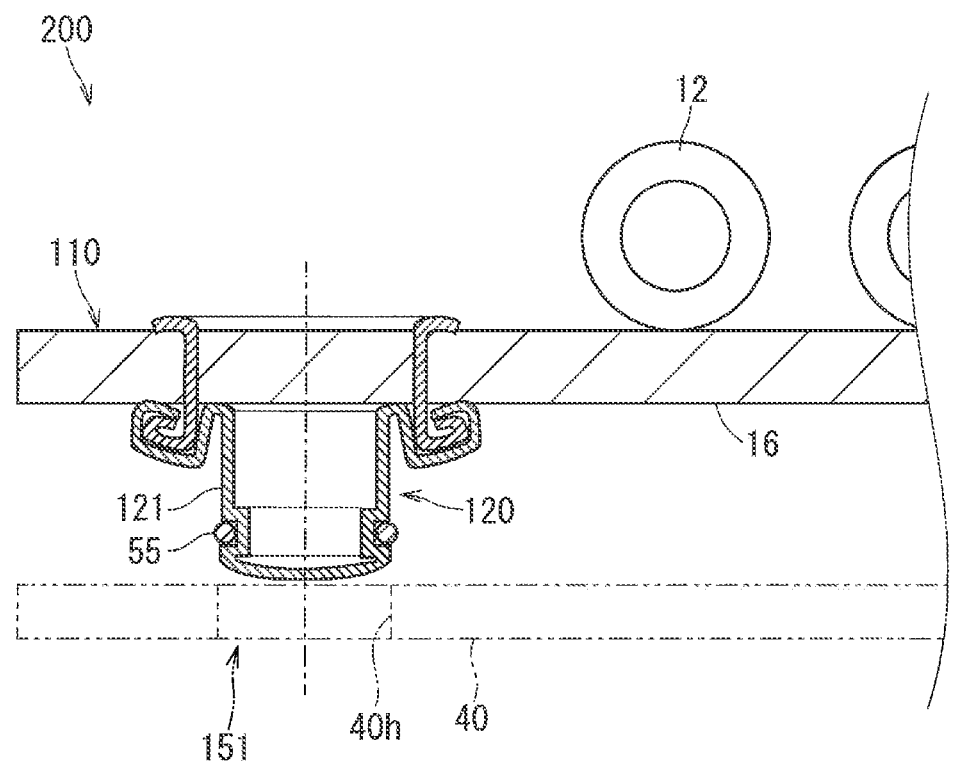
FIG. 8 A cross-sectional view illustrating an attachment structure of the wiring member according to the second embodiment.

A wiring member and an attachment structure thereof according to a second embodiment is described. FIG. 6 is a cross-sectional view illustrating a wiring member 110 according to the second embodiment. FIG. 7 is an exploded cross-sectional view illustrating the wiring member 110 according to the second embodiment. FIG. 8 is a cross-sectional view illustrating an attachment structure 200 of the wiring member according to the second embodiment. In the following description of the present embodiment, the same reference numerals are assigned to the similar constituent elements described above, and the description thereof will be omitted.

In the wiring member 110 according to the second embodiment, a shape of a male snap fastener 120 as an attaching member 120 is different from the shape of the male snap fastener 20 described above in the wiring member 10 according to the first embodiment. The attachment structure 200 of the wiring member according to the second embodiment is different from the attachment structure 100 of the wiring member according to the first embodiment in that the female snap fastener 50 is not provided in the attaching target member 40.

The male snap fastener 120 is made up of a plurality of components including a male body part 122, the ring spring 55 which is the elastic deformation part 55, and a snap 126.

The male body part 122 includes a fitting head part 123 and a flange part 124 connected to a base end portion of the fitting head part 123. The fitting head part 123 is formed into a cylindrical shape. A peripheral groove 123h is formed in an outer surface of the cylindrical fitting head part 123. The ring spring 55 is housed in the peripheral groove 123h. The fitting head part 123 and the ring spring 55 constitute the convex-shaped part 121. The flange part 124 is provided to protrude to a lateral side from the base end portion of the fitting head part 123. The flange part 124 includes an opening part 124a into which a tip end of the snap 126 passing through the sheet member 16 is inserted and a receiving plate part 124b plastically deforms the tip end of the snap 126 passing through the opening part 124a, and is formed so that the tip end of the snap 126 passing through the sheet member 16 is plastically deformed and housed therein.

The ring spring 55 housed in the peripheral groove 123h protrudes to an outer side from the fitting head part 123 in a natural state. The ring spring 55 is housed in the peripheral groove 123h so as to be able to be elastically deformed to be narrowed. The elastic deformation part 55 provided in the convex-shaped part 121 is formed to be able to narrow the convex-shaped part 121 at the time of inserting the convex-shaped part 121 into the concave-shaped part 151 and widen the convex-shaped part 121 at the time of inserting the convex-shaped part 21 into the concave-shaped part 151.

The snap 126 includes a plurality of claw parts 30 provided separately from each other in a circumferential direction, a connection part 31 connecting a base end portion of the plurality of claw parts 30, and a flange part 128 formed to spread to an outer peripheral side of the connection part 31.

A tip end portion of the claw part 30 is formed into a sharp shape to be able to pass through a part of the sheet member 16 with no hole before being attached to the sheet member 16. The tip end portion of the claw part 30 passing through the sheet member 16 is plastically deformed and housed in the flange part 124. More specifically, the tip end portion of the claw part 30 passing through the sheet member 16 has direct contact with the receiving plate part 124b through the opening part 124a, and is gradually plastically deformed in accordance with an inner surface shape of the receiving plate part 124b (a shape of a surface on a side of the opening part 124a). When the claw part 30 is plastically deformed to a degree that the flange part 128 has contact with the sheet member 16, the sheet member 16 is sandwiched by the flange parts 124 and 128, thus the male snap fastener 120 is attached to the sheet member 16.

The claw part 30 passes through the sheet member 16, thus the through hole is formed in the sheet member 16. In the case of the present example, the plurality of claw parts 30 are provided separately from each other in the circumferential direction, thus the plurality of through holes are also formed separately from each other in the sheet member. A cross section of the claw part 30 is flatly formed, thus a cross section of the through hole is also flatly formed. Each claw part 30 presses one side of the peripheral part of the flat through hole of the sheet member 16 (a peripheral part of on an outer peripheral side herein).

The female snap fastener 50 is not provided in the attaching target member 40 herein as described above in the attachment structure 200 of the wiring member. In the example illustrated in FIG. 8, the attaching hole 40h formed in the attaching target member 40 and the peripheral part thereof are used as a concave-shaped part 151. For example, when the attaching target member 40 is a member formed of a rigid material such as metal or a rigid plastic, it is also considered that a snap fastener is not attached to the attaching target member 40 but the attaching target member 40 partially constitutes the convex-shaped part or the concave-shaped part as with the example illustrated in FIG. 8.

In the case of the example illustrated in FIG. 8, a diameter of the attaching hole 40h is formed smaller than the outer diameter of the ring spring 55 in the natural state. Accordingly, when the convex-shaped part 121 of the male snap fastener 120 is inserted into the attaching hole 40h formed in the attaching target member 40, the ring spring 55 has direct contact with a peripheral surface of the attaching hole 40h and is narrowed, thereby being able to pass through the attaching hole 40h. Then, the ring spring 55 passing through the attaching hole 40h is elastically recovered, and the convex-shaped part 121 and the concave-shaped part 151 are fitted to each other.

According to wiring member 110 and the attachment structure 200 having such configurations, the claw part 30 is formed into the sharp shape, thus even if the through hole is not formed in the sheet member 16 in advance, the attaching member 120 can be attached to the sheet member 16.

Third Embodiment

Figure 9:
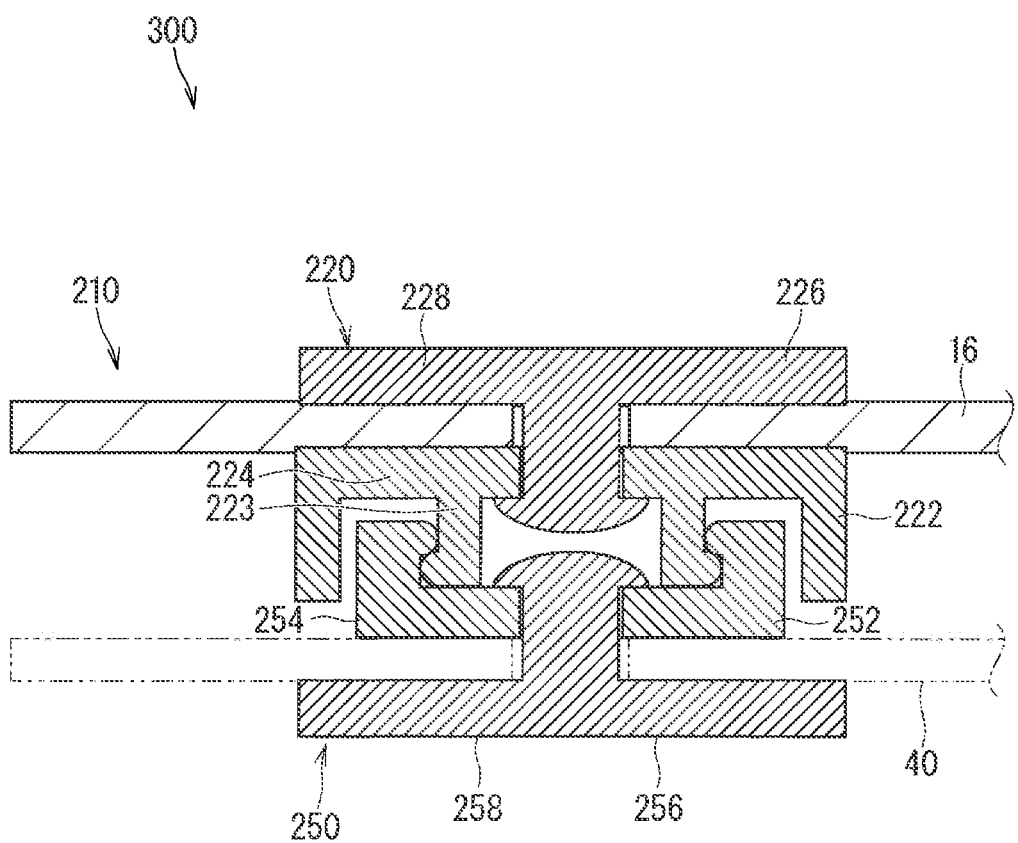
FIG. 9 A cross-sectional view illustrating a wiring member and an attachment structure thereof according to a third embodiment.
Figure 10:
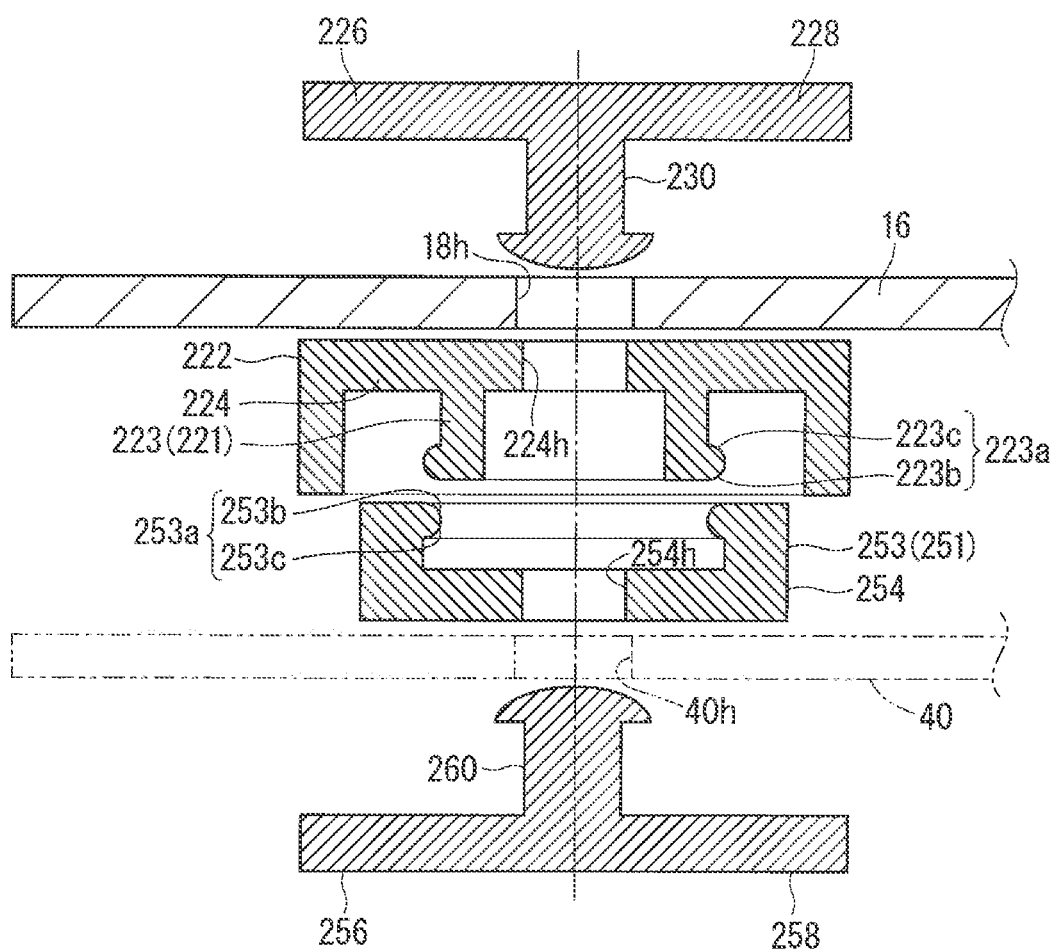
FIG. 10 An exploded cross-sectional view illustrating the wiring member and the attachment structure thereof according to the third embodiment.

A wiring member according to a third embodiment is described. FIG. 9 is a cross-sectional view illustrating a wiring member 210 and an attachment structure 300 thereof according to the third embodiment. FIG. 10 is an exploded cross-sectional view illustrating the wiring member 210 and the attachment structure 300 according to the third embodiment. In the following description of the present embodiment, the same reference numerals are assigned to the similar constituent elements described above, and the description thereof will be omitted.

In the wiring member 210 according to the third embodiment, a shape of a male snap fastener 220 as an attaching member 220 is different from the shapes of the male snap fasteners 20 and 120 described above in the wiring members 10 and 110 according to the first and second embodiments. In the attachment structure 300 of the wiring member 210 according to the third embodiment, a shape of a female snap fastener 250 is different from the shape of the female snap fastener 50 described above in the attachment structure 100 of the wiring member according to the first and embodiment.

The male snap fastener 220 includes a male body part 222 and a snap 226. Herein, the male body part 222 and the snap 226 are locked using elastic deformation, and the male snap fastener 220 is attached to the sheet member 16.

The male body part 222 includes a fitting head part 223 having a cylindrical shape and a substrate 224 on which the fitting head part 223 stands. The fitting head part 223 is the convex-shaped part 221. A protrusion 223a is formed in an outer peripheral surface of a tip end of the fitting head part 223. The protrusion 223a includes a first insertion part 223b and a second insertion part 223c located closer to a base end side of the fitting head part 223 in relation to the first insertion part 223b. The first insertion part 223b is a part gradually widened from a tip end side to the base end side of the fitting head part 223. The second insertion part 223c is a part gradually narrowed from the tip end side to the base end side of the fitting head part 223. A through hole 224h is formed in the substrate 224. The fitting head part 223 is provided in a position other than a peripheral part of the through hole 224h in the substrate 224.

The snap 226 includes a substrate 228 and a claw part 230 standing on the substrate 228. A tip end of the claw part 230 is formed to be able to be inserted into and locked to the through hole 224h formed in the substrate 224 of the male body part 222. The tip end of the claw part 230 is inserted into and locked to the through hole 224h of the male body part 222 in a state where the sheet member 16 is sandwiched between the substrate 224 of the male body part 222 and the substrate 228 of the snap 226, thus the male snap fastener 220 is attached to the base member 16.

The female snap fastener 250 includes a female body part 252 and a snap 256. Herein, the female body part 252 and the snap 256 are locked using elastic deformation, and the female snap fastener 250 is attached to the attaching target member 40.

The female body part 252 includes a cylindrical body 253 having a cylindrical shape and a substrate 254 on which the cylindrical body 253 stands. The cylindrical body 253 is formed larger than the fitting head part 223, and the fitting head part 223 can be inserted into the cylindrical body 253. Accordingly, the cylindrical body 253 is a concave-shaped part 251. A protrusion 253a is formed in an inner peripheral surface of a tip end of the cylindrical body 253. The protrusion 253a includes a first inserted part 253b and a second inserted part 253c located closer to a base end side of the cylindrical body 253 in relation to the first inserted part 253b. The first inserted part 253b is a part gradually narrowing a width of an opening from an opening side (a tip end side of the cylindrical body 253) toward a back side (a base end side of the cylindrical body 253). The second inserted part 253c is a part gradually widening the width of the opening from the opening side toward the back side. A through hole 254h is formed in the substrate 254. The cylindrical body 253 is provided in a position other than a peripheral part of the through hole 254h in the substrate.

The snap 256 includes a substrate 258 and a columnar claw part 260 standing on the substrate 258. A tip end of the claw part 260 is formed wider than a base end thereof, and is formed to be able to be inserted into and locked to the through hole 254h formed in the substrate 254 of the female body part 252. The tip end of the claw part 260 is inserted into and locked to the through hole 254h in a state where the attaching target member 40 is sandwiched between the substrate 254 of the female body part 252 and the substrate 258 of the snap 256, thus the female snap fastener 250 is attached to the attaching target member 40.

When the convex-shaped part 221 is inserted into the concave-shaped part 251, the protrusions 223a and 253a, more specifically, the first insertion part 223b in the protrusion 223a and the first inserted part 253b in the protrusion 253a have contact with each other. At this time, a part of the fitting head part 223 closer to the base end side in relation to the protrusion 223a is elastically deformed, and a part of the fitting head part 223 where the protrusion 223a is located is directed to an inner peripheral side. A part of the cylindrical body 253 closer to a base end side in relation to the protrusion 253a is elastically deformed, and a part of the cylindrical body 253 where the protrusion 253a is located is directed to an outer peripheral side. Accordingly, the protrusions 223a and 253a pass through each other and are elastically recovered after passing through each other, thus the convex-shaped part 221 is fitted to the concave-shaped part 251.

When the convex-shaped part 221 is pulled from the concave-shaped part 252, the protrusions 223a and 253a, more specifically, the second insertion part 223c in the protrusion 223a and the second inserted part 253c in the protrusion 253a have contact with each other firstly. At this time, the part of the fitting head part 223 closer to the base end side in relation to the protrusion 223a is elastically deformed, and the part of the fitting head part 223 where the protrusion 223a is located is directed to the inner peripheral side. The part of the cylindrical body 253 closer to the base end side in relation to the protrusion 253a is elastically deformed, and the part of the cylindrical body 253 where the protrusion 253a is located is directed to the outer peripheral side. Accordingly, the protrusions 223a and 253a pass through each other, and the convex-shaped part 21 is detached from the concave-shaped part 51.

In the present example, the fitting head part 223 which is the convex-shaped part 221 and the cylindrical body 253 which is the concave-shaped part 251 are formed to be able to be elastically deformed. That is to say, in the present example, the elastic deformation part is formed integrally with both the convex-shaped part 221 and the concave-shaped part 251. In this manner, the elastic deformation part may be formed integrally with the convex-shaped part, the concave-shaped part, or both of them. The elastic deformation part may be formed on both the convex-shaped part and the concave-shaped part as with the present example.

In the present example, the male snap fastener 220 is elastically deformed and attached to the base member 16. As with the attaching state of the male snap fastener 220, the attaching member 220 may be attached to the base member 16 using the fitting accompanied with the elastic deformation of the two members other than a state of plastic deformation. That is to say, the attaching member 220 may include an elastic sandwiching part and a receiving part elastically deformed and molded to be able to be fitted to each other to sandwich the base member 16 from both sides of the front-back direction of the base member 16 in a state of being fitted to each other. In the example describe above, the snap 226 and the male body part 222 are the elastic sandwiching part and the receiving part, respectively. The female snap fastener 250 can also be elastically deformed and attached to the base member 16. When the female snap fastener 250 is attached to the base member 16, the snap 256 and the female body part 252 are the elastic sandwiching part and the receiving part, respectively.

According to the wiring member 210 having such a configuration, the elastic sandwiching part and the receiving part fitted to each other sandwich the base member 16 in the base material attachment part, thus the attaching member 220 can be attached even when the base member 16 is soft.

Modification Example

FIG. 11 to FIG. 14 are plan views each illustrating a modification example of an attaching position of the attaching member 20 in the wiring member 10.

Figure 11:
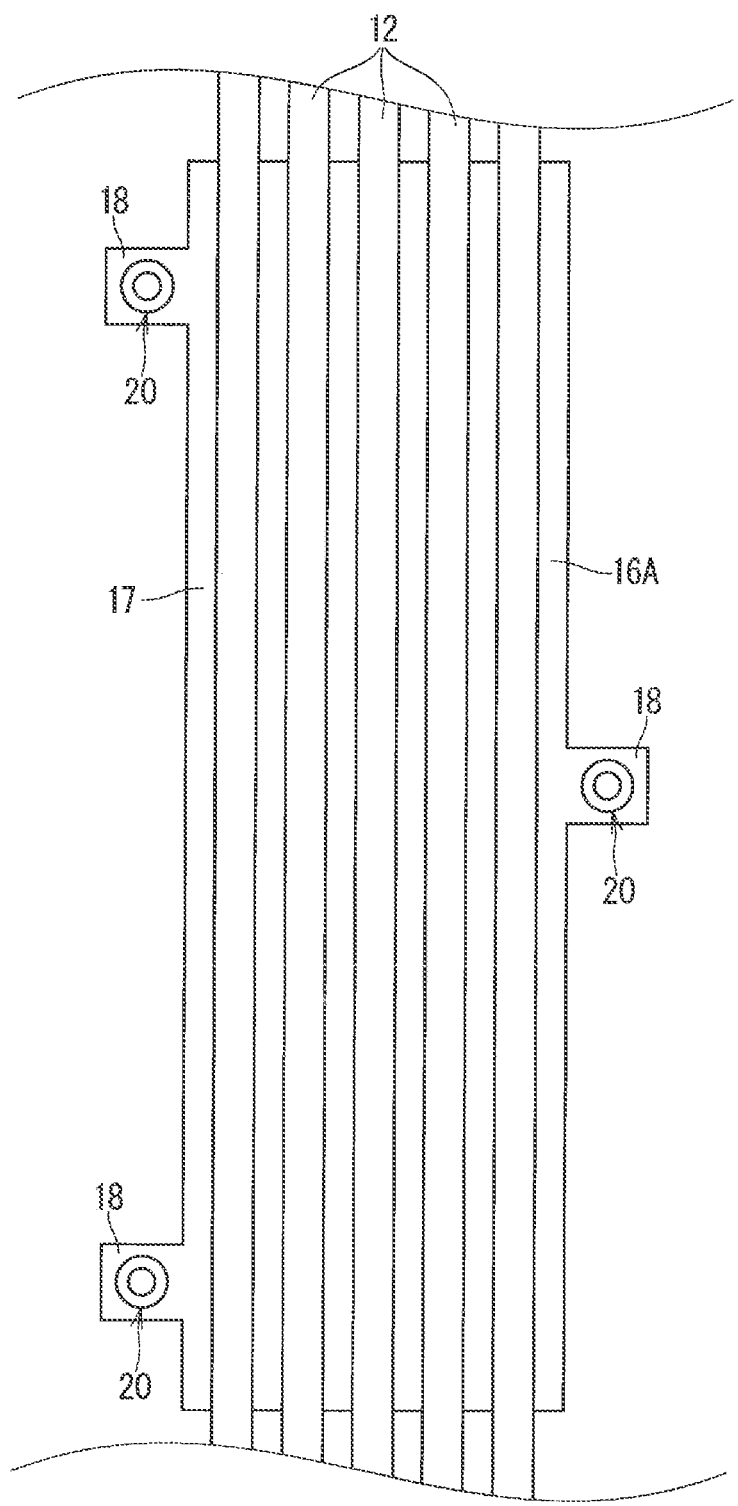
FIG. 11 A plan view illustrating a modification example of an attaching position of an attaching member in the wiring member.

In the above description, the attaching member 20 is provided on both sides of the wire-like transmission member 12 in one position along the longitudinal direction, however, this configuration is not necessary. As illustrated in FIG. 11, the attaching member 20 may be provided only on one side of the wire-like transmission member 12 in one position along the longitudinal direction. In this case, the extension part 18 where the male snap fastener 20 is not provided may be omitted in the sheet member 16A. In this case, it is sufficient that the attaching member 20 is provided on the other one side of the wire-like transmission member 12 in the other position along the longitudinal direction. Furthermore, it is sufficient that the attaching member 20 is provided in a jig-zag form along the longitudinal direction of the wire-like transmission member 12 as illustrated in FIG. 11.

Figure 12:
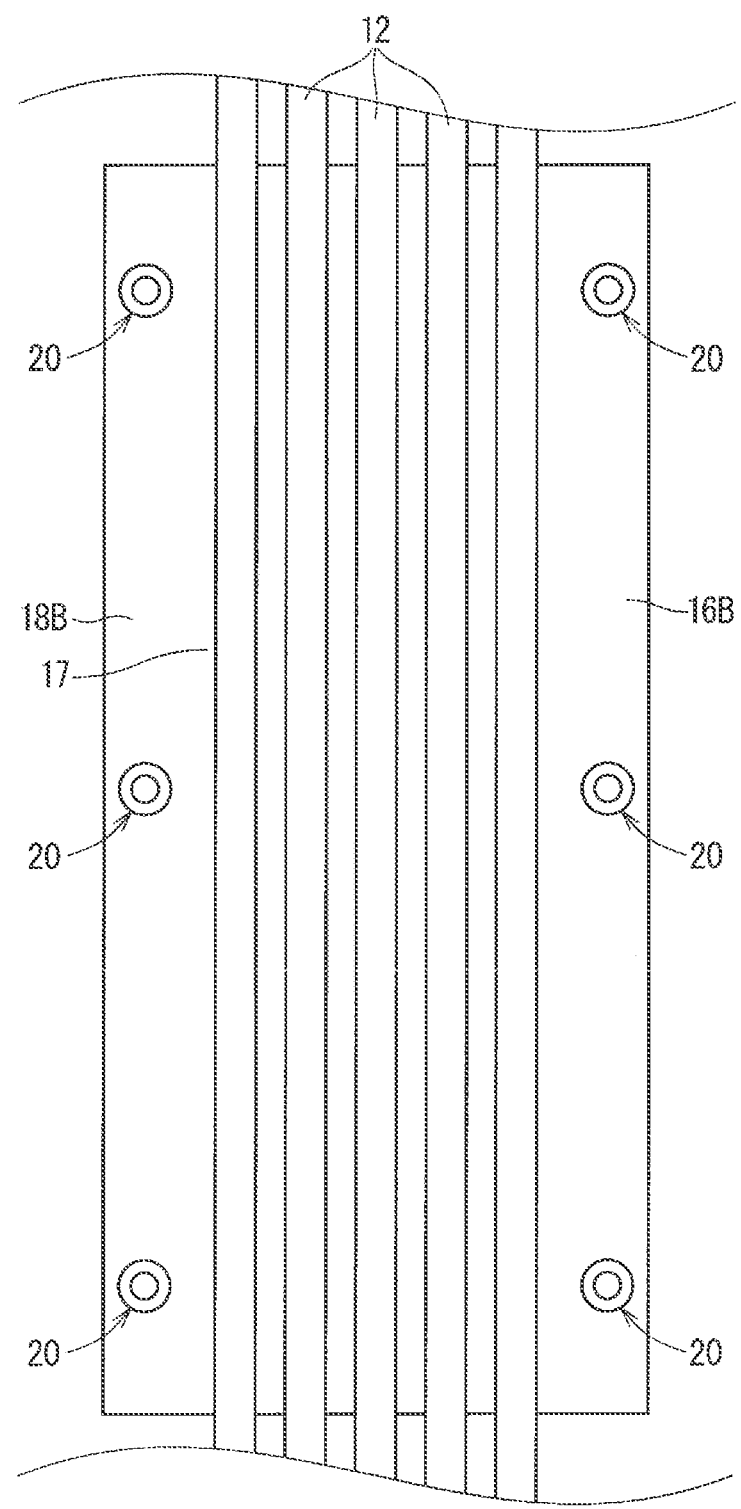
FIG. 12 A plan view illustrating a modification example of an attaching position of an attaching member in the wiring member.

In the above description, the extension part 18 provided to protrude to the lateral side from the band-like part 17 is formed to have the size corresponding to the size of the attaching member 20 in the sheet member 16, however, this configuration is not necessary. As illustrated in FIG. 12, an extension part 18B in a sheet member 16B is continuously formed along the longitudinal direction of the wire-like transmission member 12 as with the band-like part 17. In this case, the sheet member 16B may be formed into a large band-like shape.

Figure 13:
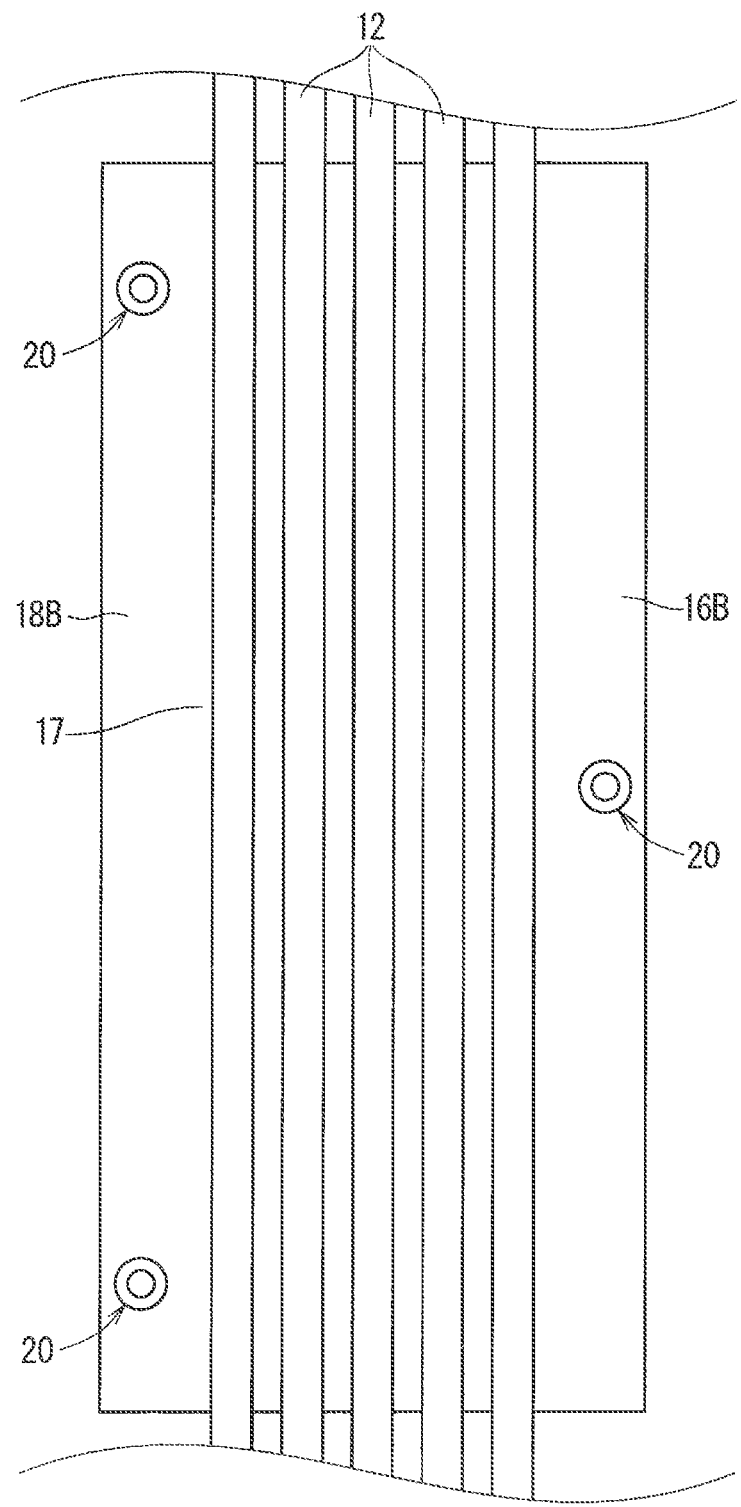
FIG. 13 A plan view illustrating a modification example of an attaching position of an attaching member in the wiring member.

As illustrated in FIG. 13, it is also applicable that the attaching member 20 is provided only one side of the wire-like transmission member 12 in one position along the longitudinal direction as is the case illustrated in FIG. 11 in relation to the extension part 18B continuously formed along the longitudinal direction of the wire-like transmission member 12.

Figure 14:
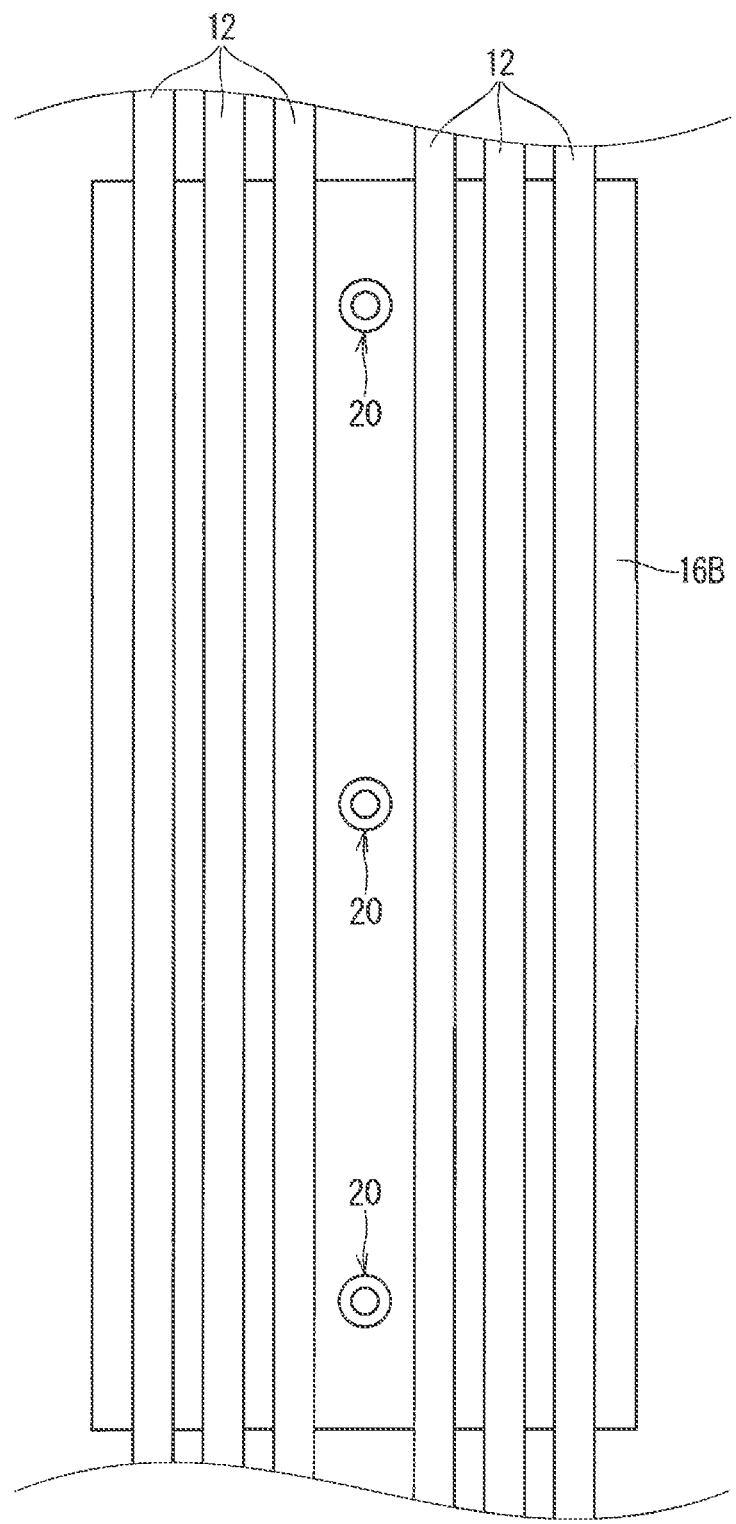
FIG. 14 A plan view illustrating a modification example of an attaching position of an attaching member in the wiring member.

In the above description, the attaching member 20 is provided on the outer lateral side of the wire-like transmission member 12 in one position along the longitudinal direction, however, this configuration is not necessary. As illustrated in FIG. 14, the attaching member 20 may be provided between the wire-like transmission members 12.

Figure 15:
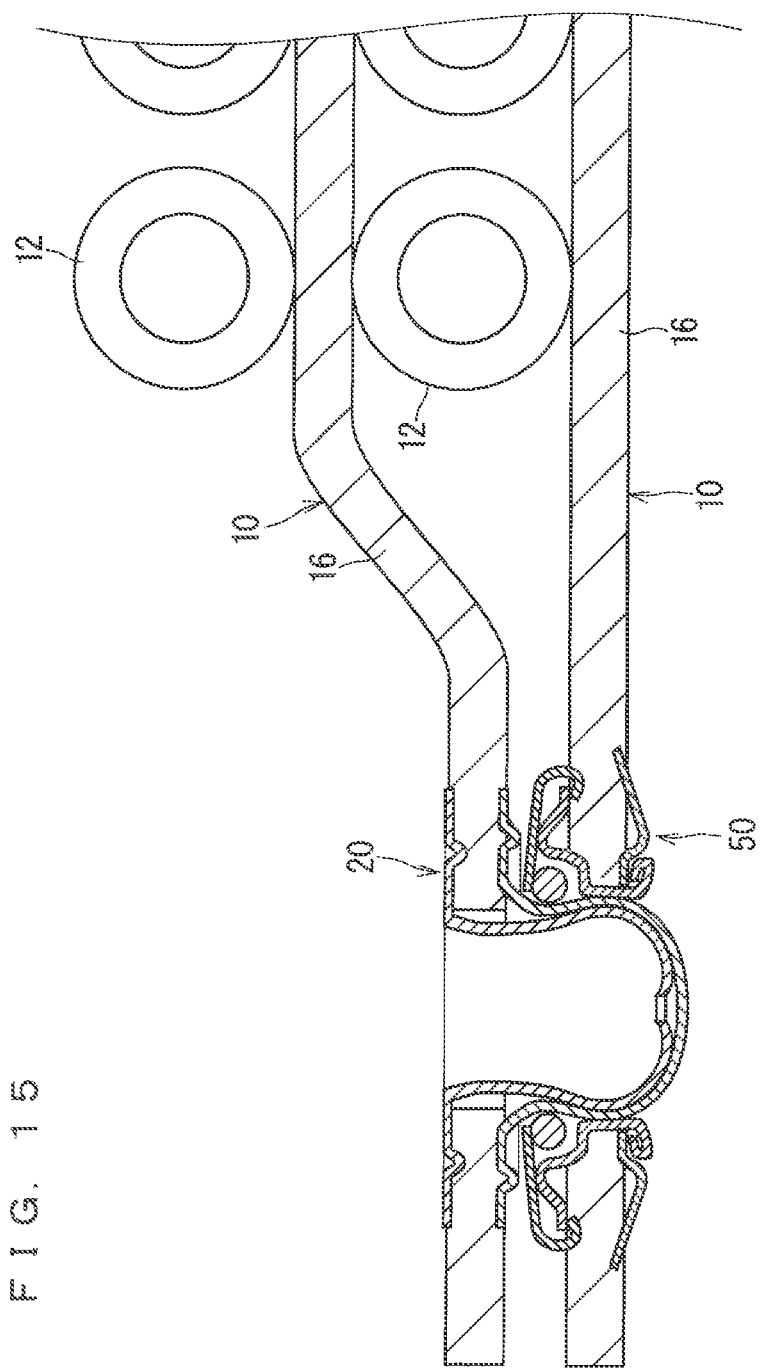
FIG. 15 A cross-sectional view illustrating a modification example of the attaching target member.
Figure 16:
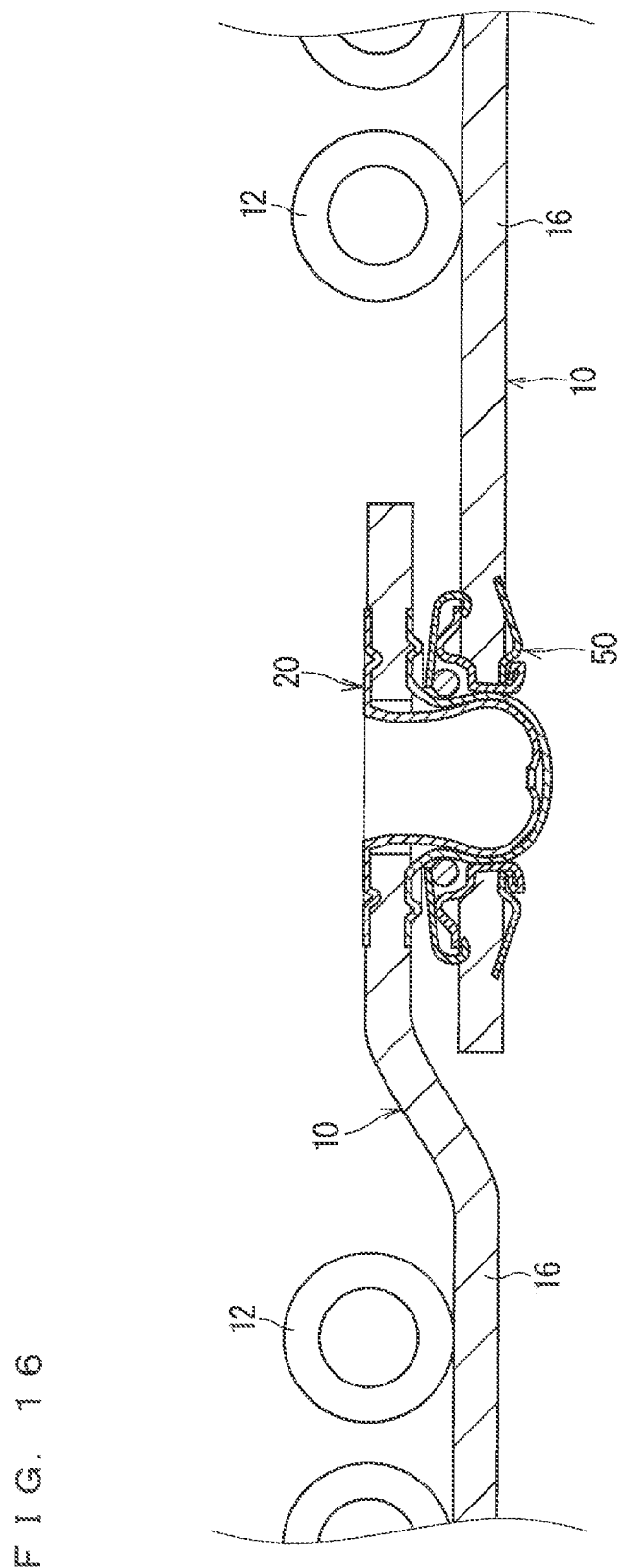
FIG. 16 A cross-sectional view illustrating a modification example of the attaching target member.
Figure 17:
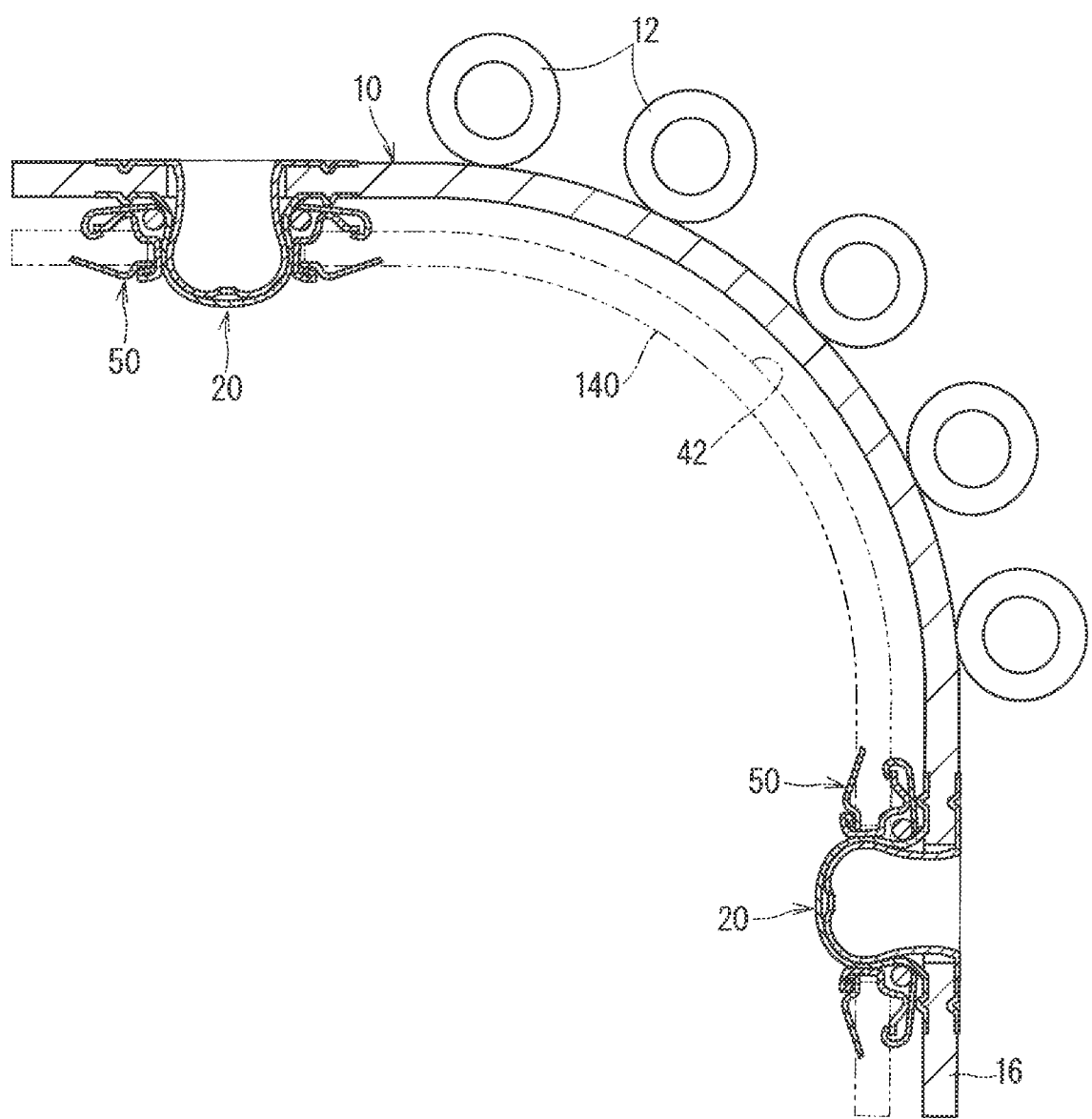
FIG. 17 A cross-sectional view illustrating a modification example of the attaching target member.

FIG. 15 to FIG. 17 are cross-sectional views each illustrating a modification example of the attaching target member 40.

In the above description, the attaching target member 40 is the vehicle body, however, this configuration is not necessary. For example, there may be a case where the attaching target member is the other wiring member 10 as illustrated in FIG. 15 and FIG. 16. In this case, one of the two wiring members 10 can be considered the other attaching target member.

In the examples illustrated in FIG. 15 and FIG. 16, the two flat wiring members 10 are attached to each other by the male snap fastener 20 and the female snap fastener 50. At this time, in the example illustrated in FIG. 15, the two flat electrical wires 10 are stacked on each other. In the example illustrated in FIG. 16, the two flat electrical wires 10 are connected to extend to a lateral side. In the example illustrated in FIG. 15 and FIG. 16, the two flat wiring members 10 are attached so that the wire-like transmission members 12 thereof are parallel to each other, however, this configuration is not necessary. The two flat wiring members 10 may be attached so that the wire-like transmission members 12 thereof intersect with each other.

In the above description, when the attaching target member 40 is the vehicle body, the flat wiring member 10 is attached to follow a planar surface part of the vehicle body, however, this configuration is not necessary. For example, as illustrated in FIG. 17, the flat wiring member 10 may be attached to follow a curved surface of the vehicle body.

More specifically, an attaching target member 140 is a vehicle body 140 having a curved surface 42. An intermediate part of the flat wiring member 10 along a width direction is curved and disposed along the curved surface 42 of the vehicle body 140. Both end portions of the flat wiring member 10 along the width direction is attached to the vehicle body 140 by the male snap fastener 20 and the female snap fastener 50. According to the present embodiment, the flat wiring member 10 can be curved and disposed along the curved surface 42 of the vehicle body 140.

Figure 18:
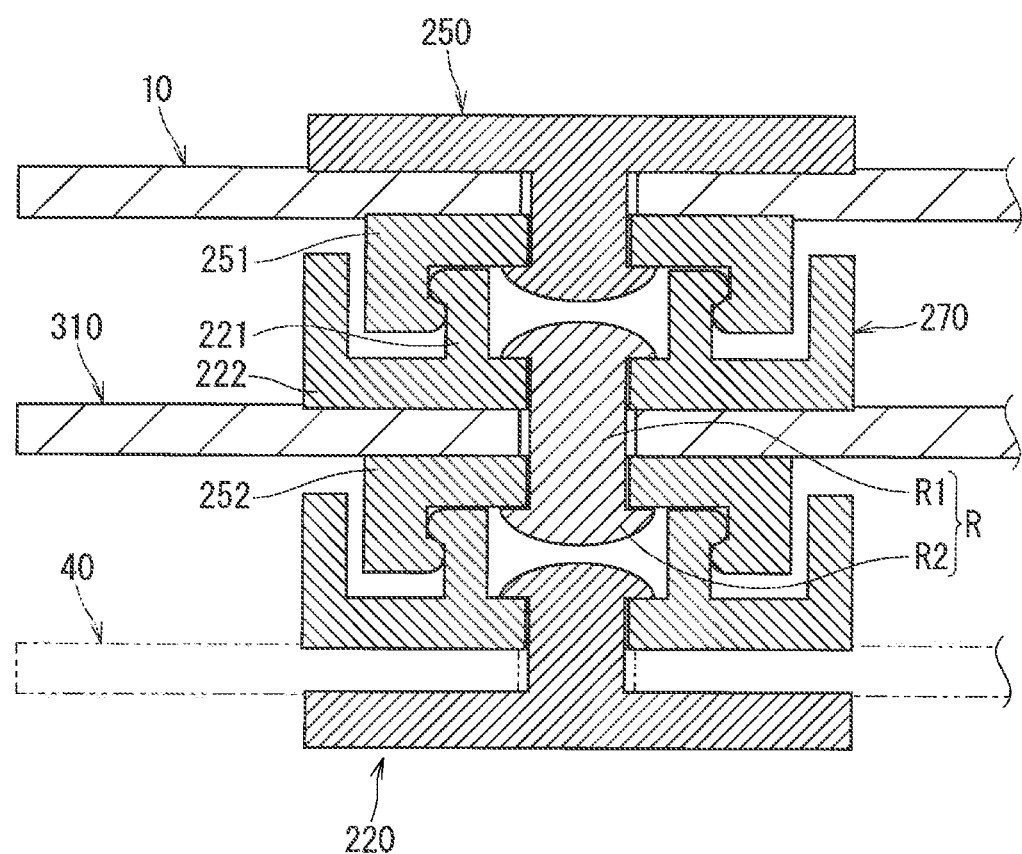
FIG. 18 A cross-sectional view illustrating a modification example of a snap fastener.

FIG. 18 is a cross-sectional view illustrating a modification example of a snap fastener.

In the above description, the two members are attached using the convex-shaped part and the concave-shaped part, however, this configuration is not necessary. As illustrated in FIG. 18, three or more members may be attached using the convex-shaped part and the concave-shaped part.

At this time, FIG. 18 illustrates an example that two wiring members 10 and 310 stacked on each other are attached to the vehicle body 40. In the example illustrated in FIG. 18, a snap fastener 270 provided in the wiring member 310 intermediately located includes both the convex-shaped part 221 and the concave-shaped part 251. That is to say, the snap fastener 270 is the male-female snap fastener 270. For example, the male-female snap fastener 270 is considered to be formed by snapping the male body part 222 and the female body part 252 mutually located in opposite directions with the sheet member 16 therebetween by a rivet R, for example.

Herein, the rivet R includes a shaft part R1 and a head part R2. The head part R2 is a part formed larger than the shaft part R1 to prevent the shaft part R1 from coming out of the base member 16 and the snap fastener 270. A tip end portion of the shaft part R1 is swaged at the time of attaching the snap fastener 270 to the base member 16 to spread as the head part R2, thereby achieving a detent of the shaft part R1.

The concave-shaped part 251 of the female snap fastener 250 is attached to the convex-shaped part 221 of the male-female snap fastener 270, and the convex-shaped part 221 of the male snap fastener 220 is attached to the concave-shaped part 251 of the male-female snap fastener 270. As described above, the other wiring member 10 and the vehicle body 40 are attached as the first and second attaching target members to one wiring member 310 by the male-female snap fastener 270. It is obvious that three or more wiring members stacked by the male-female snap fastener 270 may be attached.

Accordingly, the wiring member 310 provided with the male-female snap fastener 270 can be considered to have the attaching target attachment part provided to be able to attach the attaching target member in the front-back direction of the flat wiring body 11. According to the wiring member 310 having such a configuration, the three or more members can be attached at one position by the attaching member 270.

It goes without saying that the male-female snap fastener 270 may be provided in place of the male snap fastener 220 and the female snap fastener 250 provided in the attaching target member. The male-female snap fastener 270 can also be considered one modification example of the male snap fastener 220 and one modification example of the female snap fastener 250.

Other Modification Example

In addition, in the above description, the wiring body 11 is the flat wiring body 11, however, this configuration is not necessary. The wiring body 11 may be a wire bundle made up of the plurality of electrical wires 12 bundled to have a round shape in cross section, for example. The base member 16 is wound around the wire bundle. The base member 16 may also be a bundle member bundling the plurality of electrical wires 12 to have a round shape in cross section.

In the above description, when the attaching member 20 is attached to the wiring body 11 using plastic deformation, the plastic deformation part presses the two members provided separately from the plastic deformation part to directly sandwich the sheet material, however, this configuration is not necessary. The plastic deformation part in one member may be formed to directly sandwich the sheet member.

In the above description, the base material attachment part sandwiches the peripheral part of the through hole 18h in the base member 16, however, this configuration is not necessary. The base material attachment part may sandwich an outer peripheral part of the base member 16.

In the above description, the attaching target attachment part is detachably attached to the attaching target member 40 easily, however, this configuration is not necessary. The attaching target attachment part may be provided with a detent such as a clamp, for example, thereby being able to be attached easily by locking in accordance with the elastic deformation and hardly detached. It is also applicable that the attaching target attachment part can be attached to the attaching target member 40 by the other attaching state such as screwing.

In the example in FIG. 9 and FIG. 10, it is also applicable that each of the tip end portions of the claw parts 230 and 260 is formed into a sharp cone shape before being attached to the base member 16 to be able to pass through a part of the base member 16 where no hole is located. In this case, the tip end portions of the claw parts 230 and 260 each formed into the sharp cone shape may be a rivet part swaged and plastically deformed after passing through the base member 16 as with the rivet R.

The configurations described in the embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS

10 wiring member
11 wiring body
12 wire-like transmission member (electrical wire)
16 base member (sheet member)
20 male snap fastener (attaching member)
21 convex-shaped part
22 male body part
26 receiving part
40 attaching target member (vehicle body)
40h attaching hole
50 female snap fastener
51 concave-shaped part
52 female body part
55 ring spring (elastic deformation part)
56 receiving part
70 male-female snap fastener
100 attachment structure of wiring member

The invention claimed is:

1. A wiring member, comprising:
   a wiring body including at least one wire-like transmission member and a base member holding the wire-like transmission member; and
   an attaching member including a base material attachment part plastically deformed and sandwiching the base member from both sides of the base member in a front-back direction and an attaching target attachment part attached to an attaching target of the wiring body.

2. The wiring member according to claim 1, wherein
the base material attachment part includes a first sandwiching part and a second sandwiching part molded separately from each other to sandwich the base member from the both sides of the base member in the front-back direction and a plastic deformation part plastically deformed to maintain a sandwiching state of the first sandwiching part and the second sandwiching part.

3. A wiring member, comprising:
a wiring body including at least one wire-like transmission member and a base member holding the wire-like transmission member; and
an attaching member including a base material attachment part which has an elastic sandwiching part and a receiving part elastically deformed and molded to be able to be fitted to each other to sandwich the base member from both sides of the base member in a front-back direction in a state of being fitted to each other and an attaching target attachment part attached to an attaching target of the wiring body.

4. The wiring member according to claim 1, wherein
the base material attachment part sandwiches a peripheral part of a through hole formed in the base member.

5. The wiring member according to claim 1, wherein
the wiring body is a flat wiring body formed by arranging the plurality of wire-like transmission members on the base member.

6. The wiring member according to claim 5, wherein
the attaching target attachment part is provided to be able to attach the attaching target in a front-back direction of the flat wiring body.

7. An attachment structure of a wiring member, comprising:
the plurality of wiring members according to claim 5, wherein
the attaching member of a first wiring member in the plurality of wiring members is attached to the attaching member of a second wiring member in the plurality of wiring members.

8. An attachment structure of a wiring member, comprising:
the wiring member according to claim 5, and
a vehicle body to which the wiring member is attached using the attaching member.

9. The attachment structure of the wiring member according to claim 8, wherein
the vehicle body includes a curved surface, and
an intermediate part of the flat wiring body along a width direction is curved and disposed along the curved surface of the vehicle body, and both end portions of the flat wiring body along the width direction are attached to the vehicle body by the attaching member.

* * * * *